Figure 1:
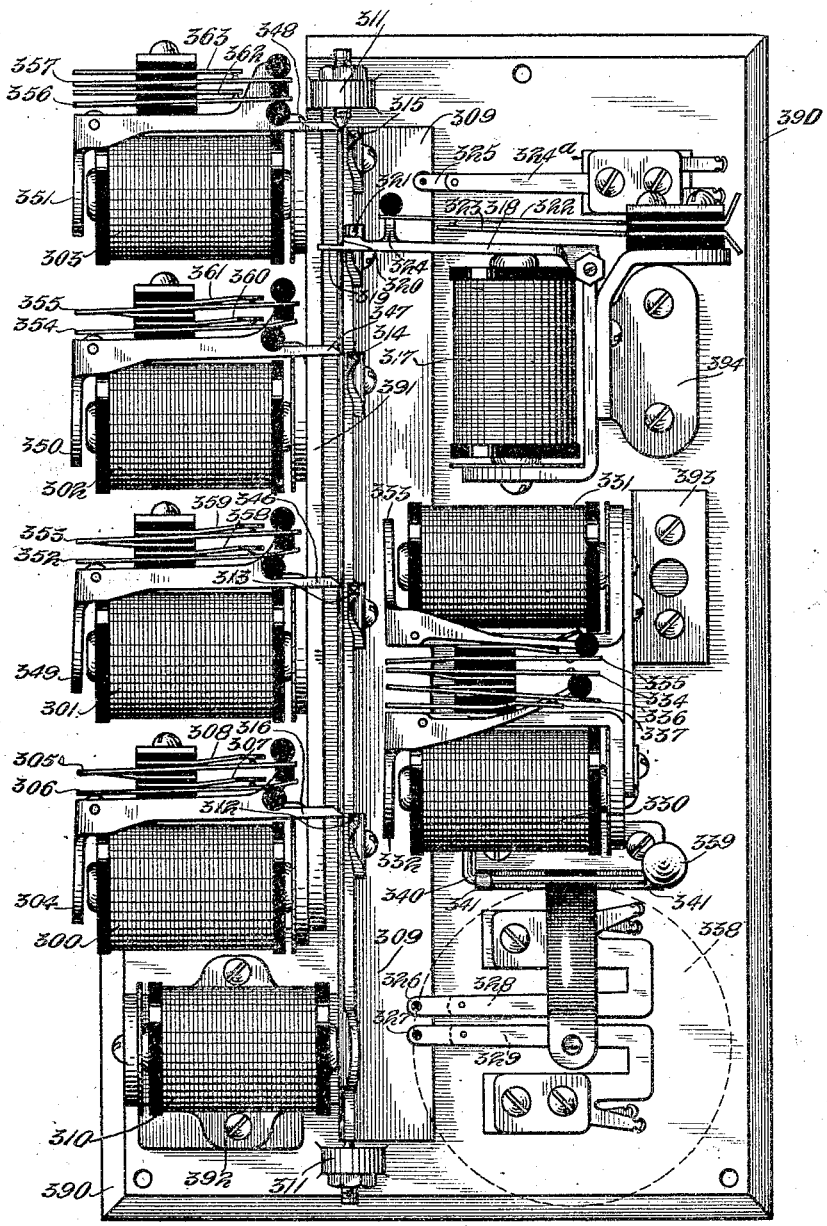

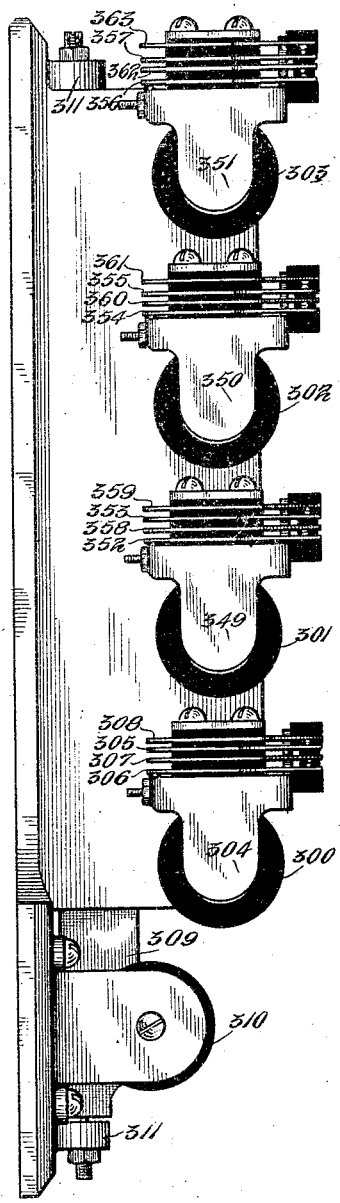
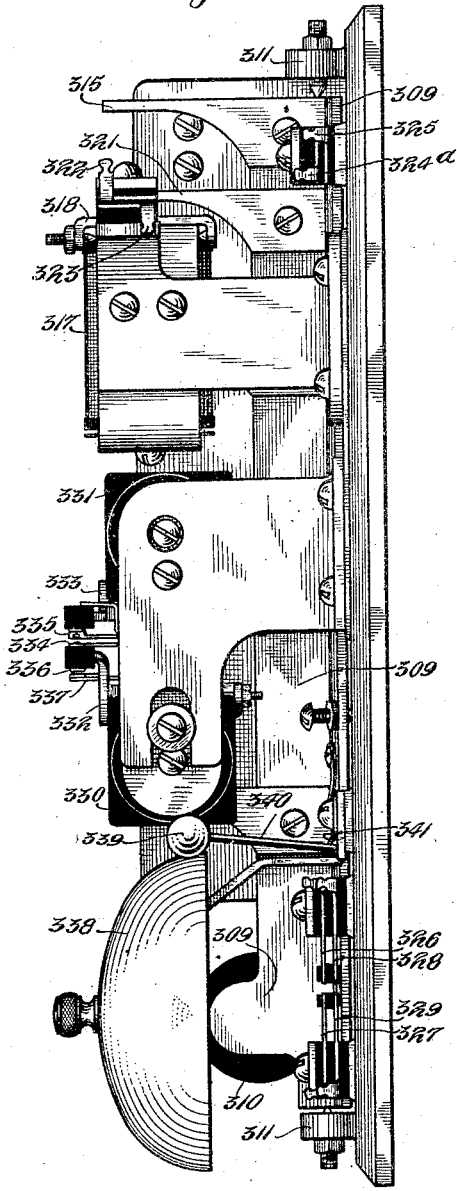

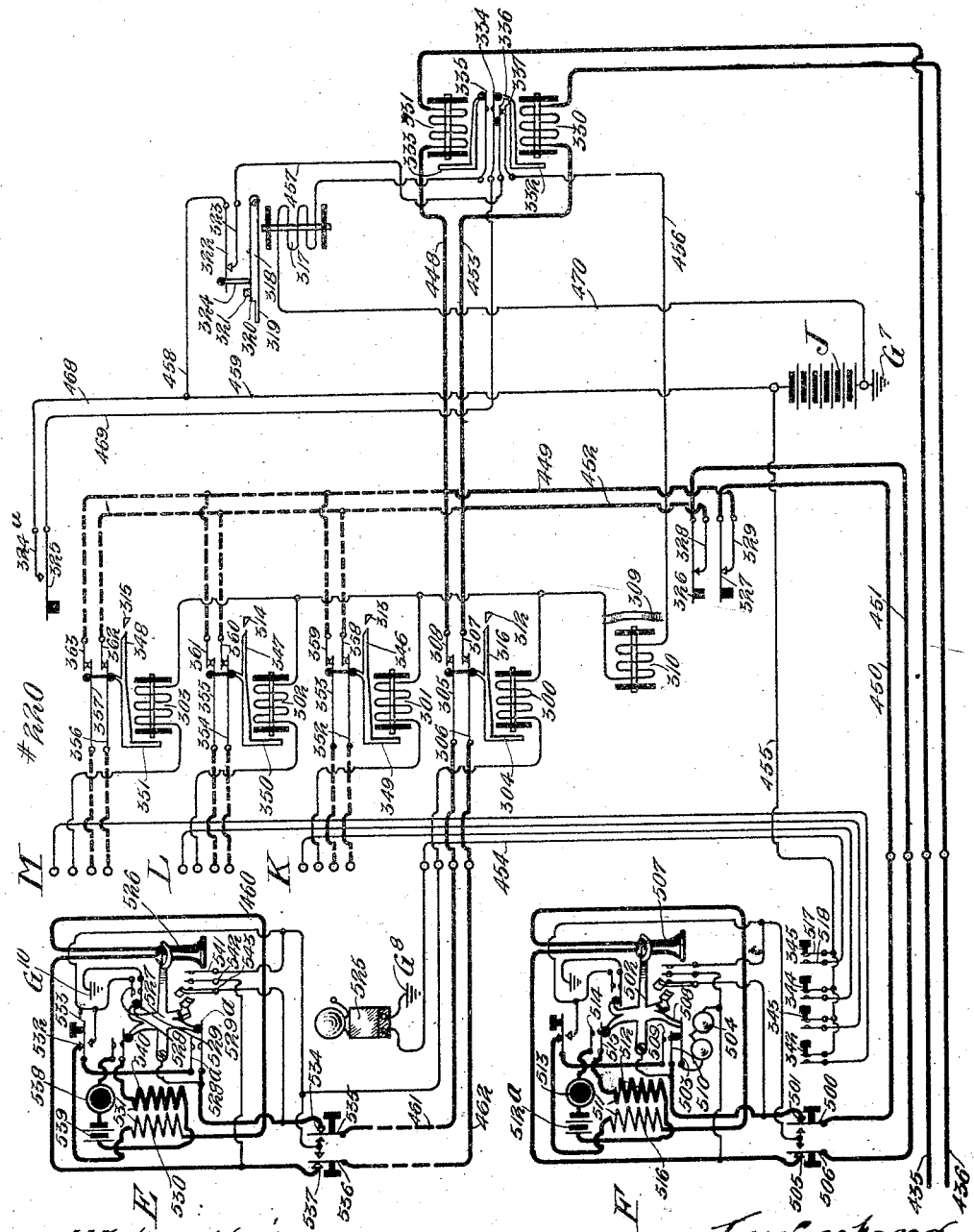

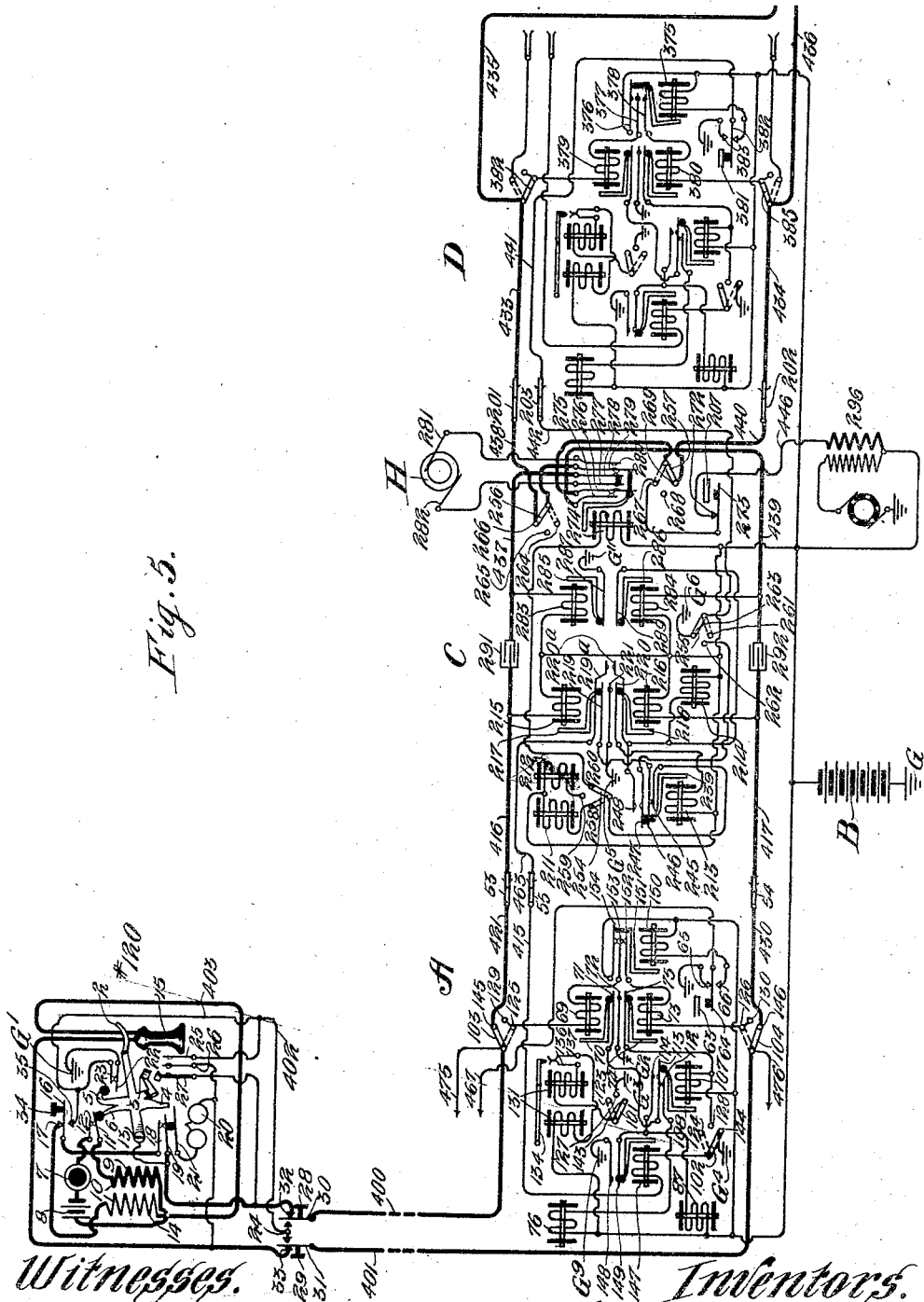

T. G. MARTIN & J. ERICKSON.
LOCK OUT FOR EXTENSION OR PARTY LINE TELEPHONES.
APPLICATION FILED DEC. 18, 1905.
1,151,545.
Patented Aug. 24, 1915.
8 SHEETS—SHEET 5.
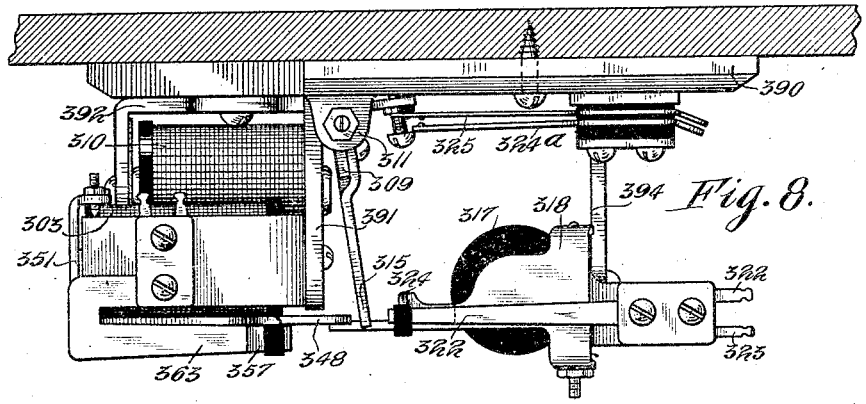
Fig. 8.
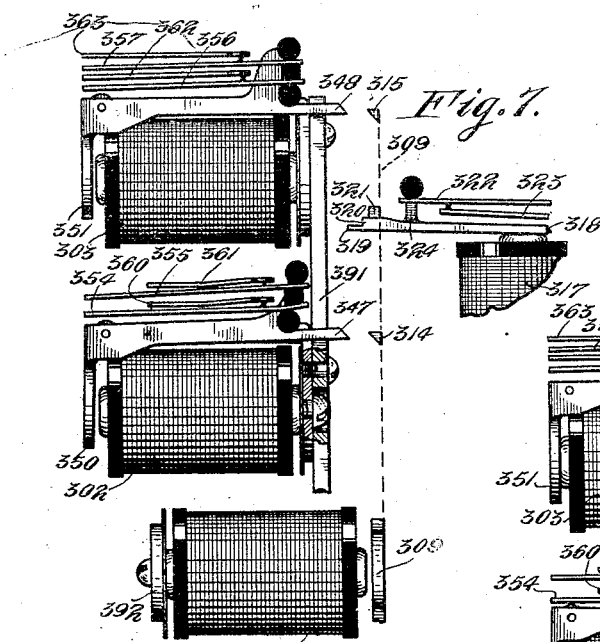
Fig. 7.
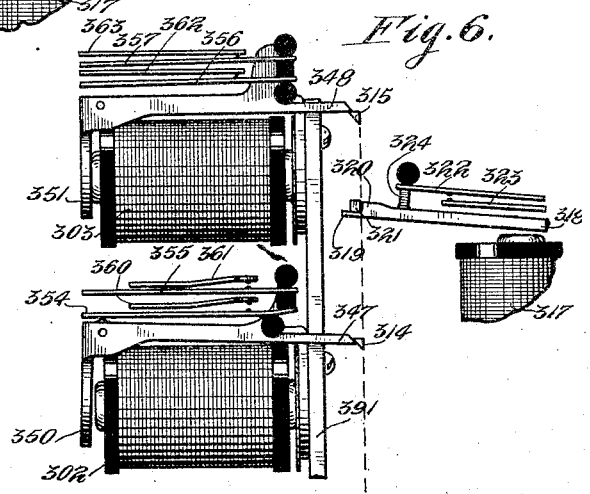
Fig. 6.
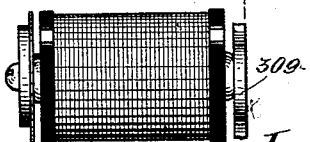
Witnesses.
Inventors.
Attorneys.

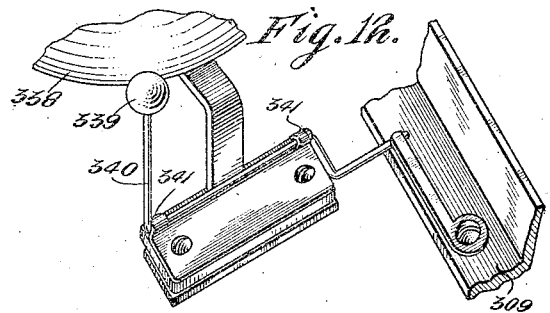
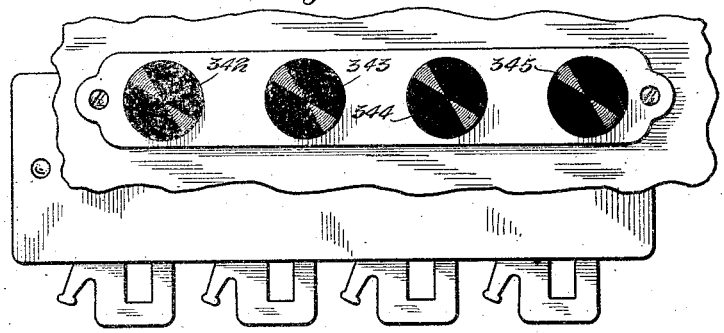
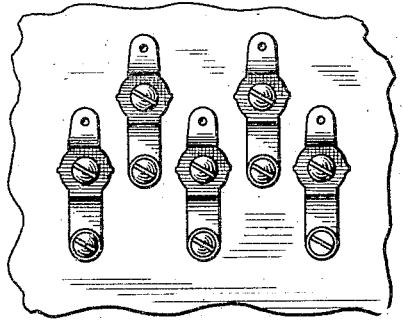
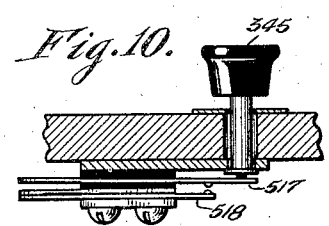

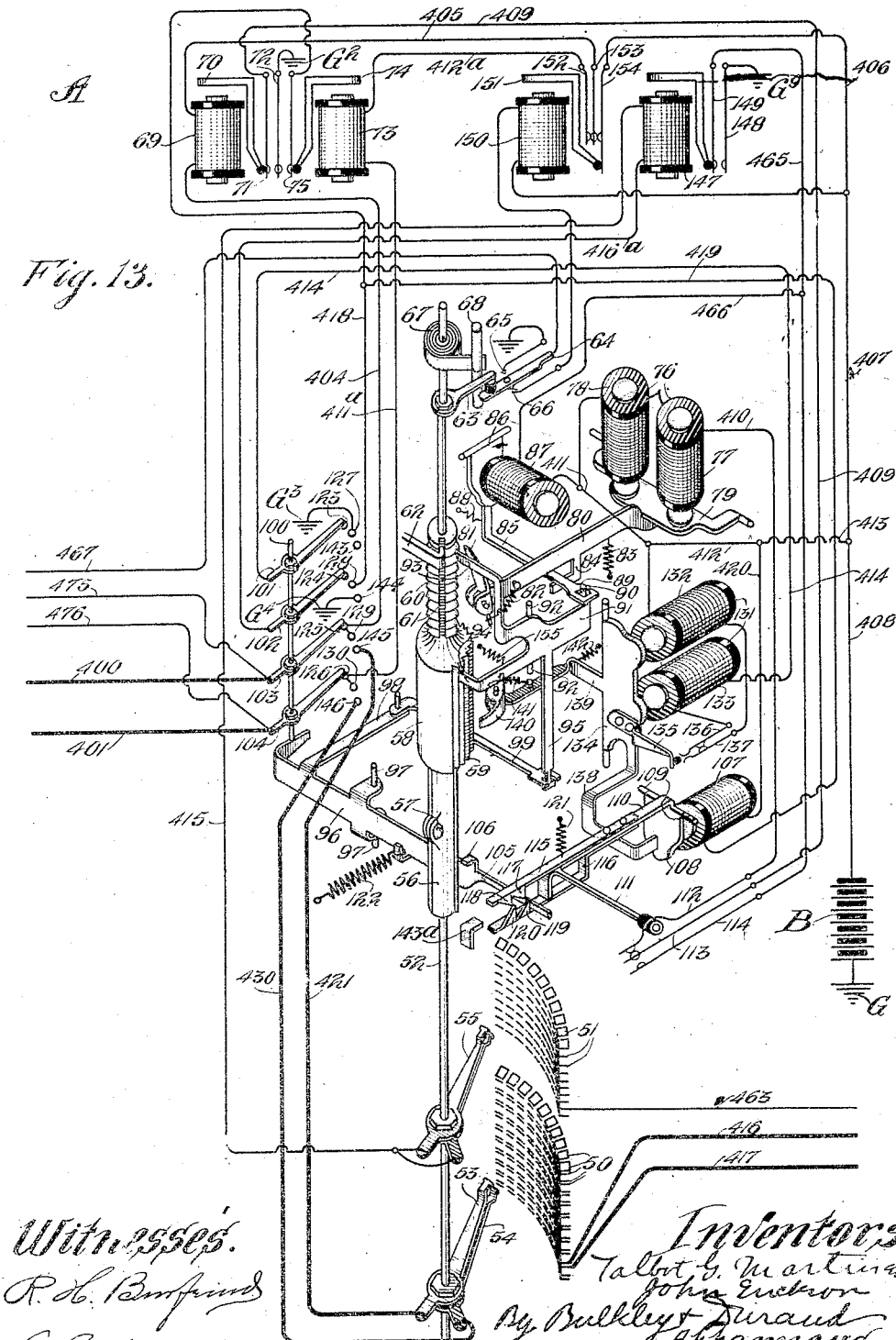

T. G. MARTIN & J. ERICKSON.
LOCK OUT FOR EXTENSION OR PARTY LINE TELEPHONES.
APPLICATION FILED DEC. 18, 1905.

UNITED STATES PATENT OFFICE.

TALBOT G. MARTIN AND JOHN ERICKSON, OF CHICAGO, ILLINOIS, ASSIGNORS, BY MESNE ASSIGNMENTS, TO FIRST TRUST AND SAVINGS BANK, TRUSTEE, OF CHICAGO, ILLINOIS.

LOCK-OUT FOR EXTENSION OR PARTY-LINE TELEPHONES.

1,151,545.  Specification of Letters Patent.  Patented Aug. 24, 1915.

Application filed December 18, 1905. Serial No. 292,188.

*To all whom it may concern:*

Be it known that we, TALBOT G. MARTIN and JOHN ERICKSON, both citizens of the United States of America, and residents of Chicago, Cook county, Illinois, have invented a certain new and useful Improvement in Lock-Outs for Extension or Party-Line Telephones, of which the following is a specification.

Our invention relates to telephone systems in general, but more particularly to automatic or semi-automatic telephone systems, and especially to automatic or semi-automatic telephone systems in which the subscribers may accomplish certain switching or trunking operations at the exchange or central station by simply transmitting one or more electrical impulses to the said exchange or central station, as, for example, by momentarily grounding a subscriber's line at the sub-station.

Still more specifically considered, our invention relates to so-called extension or party-line telephones—that is to say, it relates to arrangements of that character in which a plurality of sub-stations or subscribers' telephones are connected with a single line, either in the form of extensions from a main or master telephone, or simply as subscribers on an ordinary party-line. In such cases, it is evident that unless some provision be made to the contrary all of the subscribers connected with the line can listen-in and hear the conversation which may be going on with any particular subscriber on the line and any other subscriber. With either extension or party-line telephones this listening-in of a third party is, of course, an undesirable thing, and renders the service to such subscribers more or less unsatisfactory for obvious reasons.

Generally stated, therefore, the object of our invention is the provision of an improved construction and arrangement for preventing a third subscriber from listening-in at any time when another subscriber on the same line is using the circuit.

Special objects of our invention are the provision of an improved lock-out box adapted to be associated with the main or master telephone of an extension telephone arrangement, and whereby when a call is received, and the operator at the master telephone signals the called subscriber at one of the extension telephones, there will then be no possibility whatever of any of the other subscribers being allowed to listen-in or disturb the connections until after the two subscribers who are talking are through using the line; the provision of an improved construction and arrangement whereby all calls may be received at a main or master telephone, and whereby as soon as the operator at the master telephone signals the called subscriber at one of the extension telephones, the simple act on the part of the called subscriber in taking down his receiver will then not only serve to automatically disconnect from the line all other extension telephones, but also disconnect from the line the main or master telephone at which all calls are received and from which the different calls are then extended or forwarded to the different extension telephones; the provision of an improved construction and arrangement whereby it is not only possible for the user of any extension telephone to automatically sever the connection between the line and all other extension telephones, and between the line and the master telephone as well, but also to then automatically restore all of the extension telephones and the master telephone in connection with the line as soon as he is through using the latter, and as soon as he hangs up his receiver; and the provision of certain details and features of improvement tending to increase the general efficiency and serviceability of telephone apparatus of this particular character.

It is evident that the features and advantages of our invention are applicable to multiple, automatic or semi-automatic telephone exchange systems.

To the foregoing and other useful ends, our invention consists in matters hereinafter set forth and claimed.

Figure 14:
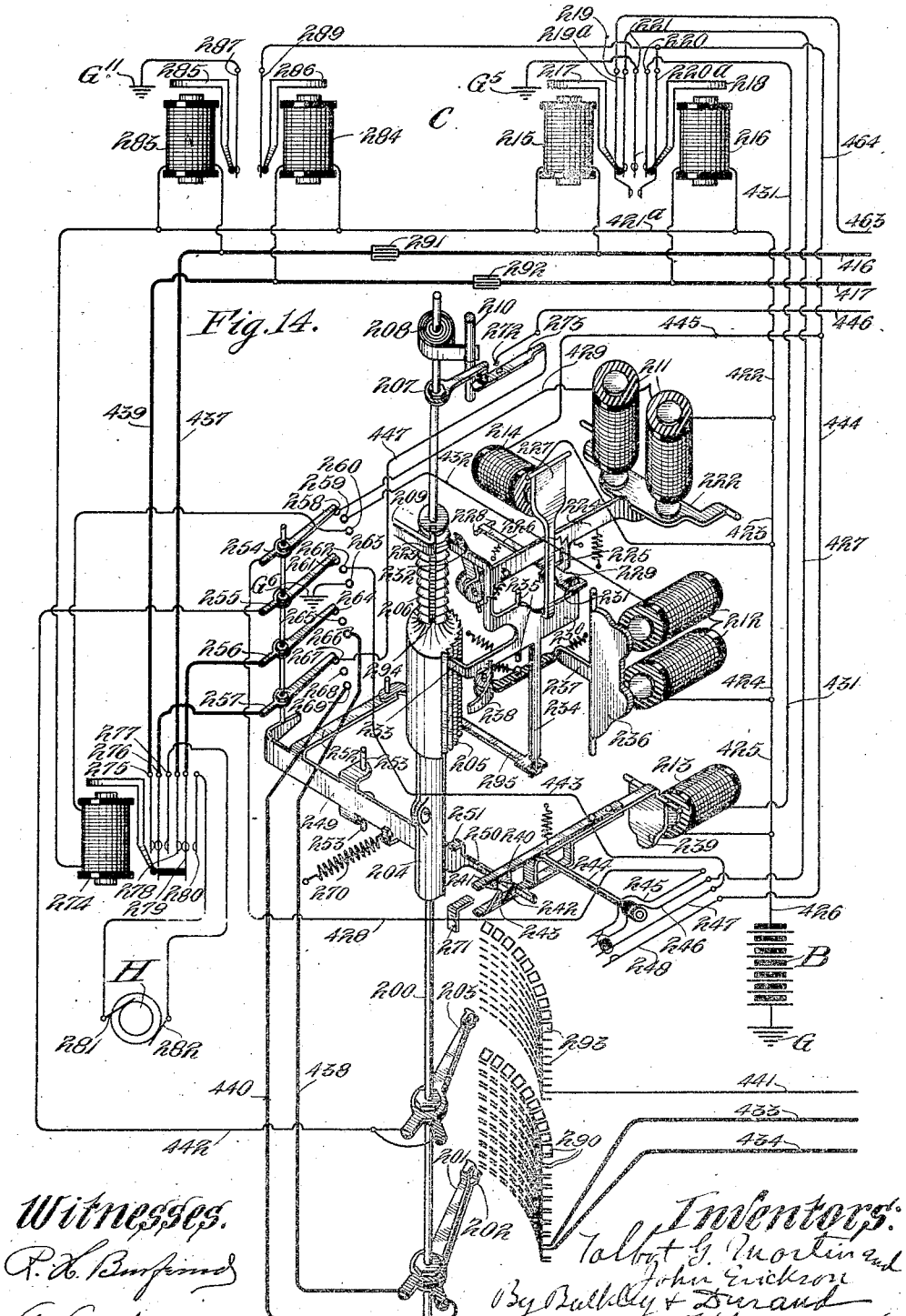

In the accompanying drawings, Figure 1 is a top view of our extension telephone lock-out box with the cover removed. Fig. 2 is a side elevation of the same, looking to the left. Fig. 3 is a similar view looking toward the right. Fig. 4 shows diagrammatically the lock-out box with one extension telephone and the master telephone connected. Figs. 4 and 5 taken together show diagrammatically a sub-station connected with a "first-selector," "connector" and called "first-selector," the lines of which latter have connected to it the lock-out box shown in Fig. 4. Fig. 6 is a top view of a portion of the lock-out box, showing a number of relays with some of the adjoining mechanism in a locked-out position. Fig. 7 is a view of the same details with the mechanism released. Fig. 8 is an end view of said details. Fig. 9 shows the terminals to which the telephones are connected. Fig. 10 is a detail sectional view of one of the push-buttons employed at the master station. Fig. 11 is a top view of said push-buttons. Fig. 12 shows certain other details in connection with a signaling-bell individual to the lock-out box. Fig. 13 is a diagrammatic perspective of the "first-selector," while Fig. 14 is a similar view of the "connector."

The sub-stations employed in connection with systems of the class in question may be of any well-known or suitable type. Sub-station #120, for instance, is at once identified by the peculiar hook-switch 2 which comprises a number of cam-like arms 3, 4, 5 and 6. A local primary circuit that contains a transmitter 7, the batteries 8 and the primary winding 9 of the induction-coil 10, comprises also two circuit-closing springs 11 and 12 which may be separated upon the downward, or brought into contact upon the upward, movement of the switch-hook, when the latter moves about the pivoting terminal 13. This is done directly through means of a cam-arm 6 which acts upon the first of said springs—spring 11. The secondary circuit comprises in turn the secondary winding 14 of the induction-coil 10, in series with the receiver 15, the signaling-button-springs 16 and 17, and two secondary circuit-springs 18 and 19 by means of which the said secondary circuit may be maintained opened or closed, depending on whether the switch-hook is up or down. The ringer-circuit at said station includes the ringer 20 and the ringer-spring 21 in series, and is bridged across the line-conductors. When the hook is down the arm 4 engages with the ringer-circuit-spring 21 and completes, at such time, the ringer-circuit at said station. Between the ringer-circuit-spring 21 and the secondary circuit-spring 19 a non-conducting piece is inserted, so that said springs may exert pressure on each other and still be kept insulated from each other. When the spring 21 is depressed the spring 19 follows and the connection between the latter and spring 18 is severed. When the hook is up the cam-arm 5 allows the spring 22 to make contact with the spring 23, and thereby controls the continuity of a ground-circuit between the ground-post 24 and the ground $G^1$. The releasing of the exchange apparatus is accomplished through the use of the release-springs 25, 26 and 27, two of which (26 and 27) are connected each one with one of the line-conductors, while the third one is connected to the ground $G^1$ when the springs 22 and 23 are closed. When the switch-hook is drawn down the release-springs 25, 26 and 27 are forced into union by the release-cam-arm 3, which latter engages a laterally-projecting piece on the upper extremity of the spring 27. Whenever the hook nears its lowest position, said arm 3 disengages from the said spring and permits all of the release-springs to again separate. The calling device is represented by the push-buttons 28 and 29, two springs 30 and 31, two contact-points 32 and 33, and a ground-post 24. The sub-station is also provided with a signaling-button 34 which is designed when pressed to separate the spring 16 from the contact-point 17 and to force it onto the contact-point 35 instead. The banks and trunk-line-terminals are supported in any suitable manner beneath the switch-frames, and with any one of said trunks a switch may make connection by means of spring-contact-arms or wipers of well-known design.

In Fig. 13, in connection with the "first-selector", are shown the line and private banks 50 and 51, respectively, one above the other. Through the former, line-trunking is done; through the latter type of bank the secrecy of the system is maintained, and certain vital and well-known operations of restoration accomplished. The switch-shaft 52 is situated on the front part of the switch, and on its lower part it carries the line-wipers 53 and 54, within range of the bank of line-contacts that form the line-bank 50, and just above the said line-wipers is located, within range of the private-bank-contacts of the private-bank 51, the private-wiper 55. All of these wipers are not only insulated from each other but from the switch-shaft as well. At its middle portion the shaft carries a cam 56 which, being of the split sleeve design, is tightened to the shaft by a screw 57. Just above the cam is a hub-like piece 58 that has a large lower section on which a number of longitudinal-teeth 59 are cut. The upper section of this hub is smaller than the lower and has cut on it a set of circular-teeth 60 which are traversed by a groove or slot 61. This groove 61 is designed to receive the bent end of the so-called shaft-support 62, which end receives the weight of the shaft during rotation of the latter, and prevents it from rotating unless said end is opposite one of the troughs of the circular-teeth. Still higher up the switch-shaft has fastened to it the normal-post-arm 63 which, when the shaft is in its lowest position, keeps the off-normal spring 64 separated from the contact-point 65 and in contact with the contact-point 66. The shaft is maintained in its normal rotary position by the coil-spring 67, which latter has its inner end fastened to the shaft 52 and its outer end to the normal-post 68. The longitudinal bearings on the shaft are not shown, but one of them is located between the private-wiper 55 and the cam 56, and the other between the upper end of hub 58 and normal-post-arm 62, said bearings being fitted to the switch-frame. The movements of the shaft, which are produced by electro-magnetically-operated ratchet and pawl mechanism, are vertical and rotary, and each movement must take place independently of the other. By these movements the wipers may be carried into engagement with any one of the hundred contact-points that constitute the private and line banks. Since these contacts are arranged in ten vertical and ten horizontal rows, the shaft is made capable of ten vertical steps, and at each level of ten rotary steps. The vertical movement of the shaft is produced by the vertical-line-relay 69, which latter when magnetized causes its armature 70 to force the spring 71 onto the spring 72; while the rotary movement results indirectly from the operation of the rotary-line-relay 73 when, through its armature 74, it presses the springs 75 and 72 into contact. Normally, the switch-shaft so rests that the wipers it carries are one step lower than the lowest level of their respective banks, and one step to the left of them. Now, when the vertical-line-relay is magnetized, the vertical-magnet 76, which is composed of two coils 77 and 78, is also magnetized. This last magnet has an armature 79, known as the vertical-armature, which has projecting from it a so-called vertical-arm 80 that carries pivotally fastened to its end a pawl 81 known as the vertical-pawl, said pawl being properly adjusted to engage one of the circular-teeth 60 at each vertical movement of the vertical-armature. This vertical-pawl is held in normal position by the retracting-spring 82 suitably fastened by one end to the back of the pawl 81 and by the other to the vertical-arm 80. The vertical-armature is provided also with a suitable retracting-spring 83 that restores said armature after it has been raised. The vertical-arm carries an L-shaped piece 84 on its under side that assists in the unlocking of the switch when it is first brought into use. This L-shaped piece 84 forks over a link 85 known as the release-link, which latter is fastened by one end to the release-armature 86 of the release-magnet 87. The release-magnet has assigned to it the office of restoring the switch to its normal position after it has been operated. This magnet is composed of two coils like the vertical-magnet, but only one coil is shown.

The release-armature like the armature of all of the other magnets is supported from the switch-frame. Said armature is kept in normal position away from the release-magnet-pole-piece by the retracting-spring 88. The forward end of the release-link 85 broadens out, and in this broadened section a square opening 89 is provided in which a lug 90 on the double-dog 91 is caught when the release of the switch takes place. This double-dog is pivoted on the switch-frame in a vertical plane and swivels about an axis through the pivots 92 and has formed on its front part two dogs 93 and 94 that are designed (the first one) to engage with the circular-teeth 60, and (the last one) with the longitudinal-teeth 59. From the lower side of the double-dog a release-arm 95 projects downward and assists in the restoration of the switch. The "first-selector" also comprises an arm 96, known as the side-switch-arm, that may be rocked about a vertical axis which passes through the pivots 97. To the left of said axis the arm 98 extends rearwardly, and on the end of this arm the link 99 is pivotally secured by one end while the other meshes with the lower end of the release-arm 95, the end of the latter being of an inverted T-shape, while the end of the former is bifurcated. Still nearer to the left end of the side-switch-arm 96, a perpendicular pin 100 holds securely four wipers 101, 102, 103 and 104, known as the side-switch-wipers. These wipers are insulated from each other and from the supporting-pin to which they are all rigidly fastened. The said wipers are rigid with the pin and the pin is rigid with the side-switch-arm 96. Said arm and appended parts are known as the side-switch. When the side-switch-arm is rotated about the pivots 97, the side-switch-wipers and the side-switch as a whole will move. The right end of the side-switch-arm is drawn out into a finger 105, known as the escapement-finger, that works in conjunction with a tooth-escapment herein described. At the base of this finger a forwardly-bent lug 106 is designed to limit the rocking movement of the side-switch before the shaft is rotated out of its rotary normal position. If the rotary-line-relay presses the spring 75 onto the ground-spring 72, the private-magnet 107 is energized as a result. This last magnet is usually fastened to a small private-magnet-frame that is not shown, and which is fastened to the main switch-frame. Said magnet has an armature 108 that works in a vibratory manner about a horizontal axis which passes through the supporting-points 109. This armature is formed with a rearwardly-projecting arm 110, the latter having two flat surfaces in an approximately horizontal plane. Furthermore, the end of said arm is bent downwardly at right angles and carries certain mechanical details, namely, a lateral arm 111 designed to control circuits comprising private-springs 112, 113 and 114, and a toothescapement which includes two flexible springs 115 and 116 each of which is riveted at one end to the arm 110, one on the upper side and the other on the lower. The upper spring is straight and has formed on its end two tooth-projections 117 and 118 which extend down, while the other one is bent down and at right angles again to the front. This double angle on the lower spring is so designed that the latter may clear the bent portion of the private-arm, against which portion said spring rests with a suitable degree of tension, and so that there may be space in front of said bent portion to receive two other tooth-shaped upwardly-projecting pieces 119 and 120 that are formed on the forward end of the escapement-spring 116 and which are situated in juxtaposition to the upper teeth, but slightly to the rearward of them. A retracting-spring 121 suitably located holds said armature normally away from the private-magnet-pole-piece. With this construction, if the private-magnet is energized once, the private-armature is drawn down once and restored. By this operation the escapement-finger 105 first passes from behind the tooth 119 to the rear of the tooth 117 at the downward stroke of the private-armature, and then from behind the latter tooth at the return stroke. As soon as the escapement-finger clears this last tooth the retracting-spring 122 draws the side-switch to the second position where it is stopped when the lug 106 strikes the cam 56. When the side-switch passes to the second position it carries the wipers 101, 102, 103 and 104 from engagement with the contact-points 123, 124, 125 and 126 and into engagement with the contact-points 127, 128, 129 and 130. Then the rotary-magnet 131 is energized as soon as the wiper 101 finds the contact-point 127. This latter magnet is composed of two coils 132 and 133.

The rotating mechanism of the "first-selector" consists of the rotary-armature 134, a circuit-interrupting-arm 135 that works in conjunction with two interrupter-springs 136 and 137, the rotary-armature-finger 138 that exercises certain controlling influences over the private-armature 108, and lastly the rotary-arm 139. This arm 139 carries pivotally supported on its forward end the so-called rotary-pawl 140, and said pawl has attached to its rear end a small coiled spring 141, the other end of which latter is fastened to the rotary-arm, and which always restores the rotary-pawl to its normal position. At each rotary step of the shaft the rotary-locking-arm 94 falls behind one of the longitudinal-teeth and locks the shaft. Said locking-arm and circular-teeth form the circular locking device. When the side-switch-wiper 101 engages the contact-point 127 the rotary-magnet 131 is energized and attracts the rotary-armature 134, thereby forcing the rotary-pawl 140 onto the longitudinal-teeth 59. The shaft is rotated one step by the time the rotary-armature 134 strikes the rotary-magnet-pole-pieces. The energizing-circuit of the rotary-magnet includes the interrupter-springs 136 and 137, but when the rotary-armature is attracted, and, therefore, when said springs are separated by the interrupter-finger 135, the said circuit is interrupted. When the energizing-circuit is broken the rotary-armature is drawn to its normal position by the rotary-armature-retracting-spring 142; but when the shaft is rotated so that the cam 56 passes away from the lug 106, the finger 105 falls against the tooth 120; then as the rotary-armature is drawn down by the rotary-magnet 131, the rotary-armature-finger 138 depresses the private-armature 108, causing the finger 105 to disengage from the tooth 120 and advance against the tooth 118. As the rotary-armature returns to normal, as stated, the private-armature, on following the finger 138, permits the finger 105 to escape from the tooth 118, thus permitting the side-switch to pass to third position with the finger 105 resting against the side-switch-stop 143ᵃ. The side-switch-wipers 101, 102, 103 and 104 are then, respectively, on the contact-points 143, 144, 145 and 146.

Attention has been called to the banks that are located under the switch parts and in position in front of the line-wipers and the private-wipers. The terminals of the private-bank are each one electric conducting piece; but the terminals of the line-banks are each made of two metallic pieces, one over the other, and insulated from each other. When the shaft is raised and rotated, the wipers engage with the contacts of their respective banks, the private-wiper with those of the private-bank and the line-wipers with those of the line-bank. After the switch has been operated it can be released by the energizing of the release-magnet 87, which energizing results if the line-relays 69 and 73 are magnetized simultaneously, or if the back-release-relay 147 that controls the back-release-relay-springs 148 and 149 is energized. The circuits that are brought into play under these conditions will be traced hereinafter.

When the release-armature is drawn back, after the release-magnet loses its magnetizing force, the double-dog is drawn away from the shaft. Said shaft, when raised and rotated, rests on the shaft-rest 62, as previously stated, and then when left to the back pull of the coiled spring 67 rotates back on the said shaft-rest until the normal-post-arm 63 strikes the normal-post 68. The shaft-rest then enters the channel 61 that traverses the circular-teeth, and leaves the shaft to fall to its normal position by its own weight. The "first-selector" is provided in addition with a bridge-cut-off-relay 150, the armature 151 of which is adapted to separate the bridge-cut-off-relay-springs 152, 153 and 154. The former two (152 and 153) constitute the terminals of the rotary and vertical line-relays 73 and 69, respectively, while the latter (154) is connected directly with the non-grounded terminal of battery B.

Fig. 14 shows the "connector" C which has many of its parts and circuits very similar to those of the "first-selector." The switch-shaft 200 is identical with the switch-shaft of a "first-selector," and the line-wipers 201 and 202, the private-wiper 203, the cam 204, the longitudinal and circular teeth 205 and 206, respectively, the normal-post-arm 207 and the coiled spring 208 are at once recognized. The shaft-rest 209 and normal-post 210 are well-known, as well as the vertical-magnet 211, the rotary-magnet 212, the private-magnet 213, the release-magnet 214 and the vertical and rotary line-relays 215 and 216. The said line-relays 215 and 216, through their respective armatures 217 and 218, operate the line-relay-springs 219 and 220 with respect to the line-relay-ground-spring 221 for the same direct purpose that the line-relay-springs of the "first-selector" are operated. Furthermore the trunk-release-springs 219ª and 220ª are at the same time operated with respect to each other. The vertical-magnet, as usual, controls the vertical movements of the shaft through the vertical-armature 222 and the pawl 223 on the end of the vertical-arm 224. The latter performs its usual functions through the medium of the L-shaped piece 225 upon the release-link 226. In the "connector" the release-armature 227 is on the right-hand side of the release-magnet 214, instead of on the left, and the release-link 226 instead of being fastened to said armature is fastened from the pin 228 to the frame of the switch in its usual position under the release-magnet. The method of release in the "connector" is slightly different from that in the "first-selector." Instead of the release-link being thrown forward to catch the lug 229 on the double-dog 230, the latter is kicked by the release-armature 227 and rotated until said lug passes under the aperture 231, at which instant the link falls over said lug and locks the double-dog. Said double-dog is the same as the double-dog of the "first-selector," and is, therefore, provided with the vertical-dog 232, the rotary-dog 233, the side-switch-release-arm 234 and the pivots 235 about which said double-dog swivels.

The rotary-armature 236 of the "connector" is very simple and carries only the rotary-arm 237, which latter, on its end, supports the rotary-pawl 238; but the private-armature 239 is provided with the usual escapement-teeth 240, 241, 242 and 243, and with the arm 244 that engages with the private-springs 245, 246, 247 and 248. The side-switch of the two types of switches being alike, the side-switch-arm 249, the escapement-finger 250, the lug 251, the arm 252, and the pivots 253 perform the same functions as those allotted to the similar parts of the switch previously described. Also, the side-switch-wipers 254, 255, 256 and 257 and the rows of contact-points 258, 259 and 260; 261, 262 and 263; 264, 265 and 266; and 267, 268 and 269 over which said wipers slide back and forth need no explanation with regard to their mechanical operations and construction. The side-swtich is operated one step at a time each time the private-magnet is actuated and is drawn forward at each step by the retracting-spring 270. When in the third position the side-switch-arm 249 rests against the side-switch-stop 271. The side-switch as a whole is operated by the private-armature 239 in the same way as the side-switch of the "first-selector," and the private-springs are operated by the arm 244, so that when the private-armature is down the springs 247 and 248 are together, and when up the springs 245 and 246 are in contact. The "connector" has two off-normal springs 272 and 273 which are included in the busy signaling circuit, which latter will be pointed out hereinafter. The "connector," unlike the "first-selector," has a ringer-relay 274 which, through its armature, controls the springs 275, 276, 277, 278, 279 and 280 by means of which ringing-current is supplied in the right direction after the connection has been made. Two of said springs (280 and 277) constitute the terminals of the ringer-generator H and are connected, respectively, with the brushes 281 and 282. In addition, the "connector" has a back-release-circuit in which are included the back-release-relays 283 and 284 for the purpose of enabling a called subscriber to release a connection with his line if a calling party neglects to release. Said relays, through their respective armatures 285 and 286, have the ability to press the two back-release-relay-springs 287 and 289 into contact, when the said relays are magnetized simultaneously.

The lock-out box, as shown in Fig. 1, comprises four cut-out relays 300, 301, 302 and 303 of the same make. Like the rest of said relays the relay 300 has an armature 304 through the medium of which the springs 305 and 306 may be separated from the springs 307 and 308. Said box also comprises an angle-iron-shaped locking-armature 309 which is subject to the pull of the locking-magnet 310, and which is pivoted upon the two supports 311 and in front of the cut-out-relays. Upon said armature 309, and at points in front of each one of said relays, there is placed a locking-finger 312, 313, 314 and 315. The armature of the relay 300 has an extending finger-like projection 316, the front end of which is chamfered and so normally adjusted that if the magnet 310 attracts the armature 309 the locking-finger 312 allotted to the relay in question will slide over the chamfered surface of the extended armature-finger 316, pressing the latter to the left and thus forcing the spring 305 from the spring 308, and the spring 306 from the spring 307. But if the armature 309 is attracted by the locking-magnet 310, while the armature 304 is drawn up by the relay 300, the locking-finger 312 passes to the left of the armature-finger 316, as shown in Fig. 6, in connection with the relay 303, and does not then interfere with the connection between the relay-springs under the control of said finger. There is a so-called release-magnet 317 the armature 318 of which extends toward the locking-armature 309. On the end of the release-armature 318 there is a notch formed between the extreme end 319 and an enlarged section 320 of the said armature. Normally, said armature is retained against the pole-piece of the release-magnet by an extra lug 321 that is also secured to the locking-armature 309. Whenever the locking-armature is drawn up by the locking-magnet 310, the lug 321 slips from on top of the enlarged section 320 into the notch on the end of the said release-armature. This latter armature, when free, is always subject to the tension of the spring 322, which is sometimes aided by the spring 323. The former engages with an elbow 324 upon said armature, imparting to the latter a tendency to travel to the right as soon as the lug 321 clears the enlarged section 320, at which time the release-armature leaves the pole-piece of the release-magnet and locks the locking-armature in its attracted position through the medium of the lug 321. It is evident that even after the locking-magnet loses its magnetic force the locking-armature 309 is retained in its unusual position as long as the release-armature retains the lug 321 within the notch on its end. However, if the release-magnet is magnetized and the release-armature 318 is attracted against the pull of the spring 322, the armature 309 is restored to its normal position by the spring tension of two sets of springs 324ᵃ and 325 and 326 and 327, the former one of these last two being normally in contact with spring 328, and the latter one with spring 329. These springs pressing on the horizontally-disposed section of the locking-armature naturally rotate the armature in a direction to restore the lug 321 to its normal position above the enlarged section 320 upon the release-armature. Besides the relays already mentioned, two line-relays 330 and 331 are used in connection with the lock-out box, each one of which is provided with an armature 332 and 333, respectively; the armature 332 having the ability when attracted by the relay 330 to force the spring 334 toward the spring 335 and the spring 336 away from the spring 337; while the armature 333 when attracted by its magnet forces the spring 335 toward the spring 334. The said springs 334 and 335 and the armatures that control them are so adjusted that not until both of said armatures are attracted simultaneously do the said springs 334 and 335 come into contact. To the left of the relay 330 and in front of the locking-magnet a gong 338 is mounted above the springs 326 and 327. In connection with this gong a striker 339 is provided and fastened to the end of a crank-arm 340. This crank extends down from the striker and then at right angles through the bearings 341, then again at right angles to the right, and again beneath the relay 330 at right angles toward the locking-armature 309 in such a way that each time the locking-armature is attracted the striker 339 is thrust once against the bell 338. The mechanism thus described is clearly shown in Fig. 12.

A number of extension sub-stations, like the sub-station E, are afforded access to a line of two conductors connected with an automatic central office and terminating in a "first-selector" such as "first-selector" D. Such a line is given one number, and any outside subscriber desiring to communicate with any one of the subscribers of said line calls in the ordinary way and completes a connection. Then, upon signaling, an operator at the master station F answers. The operator inquires which sub-station is desired and, being informed, presses either one of the signaling-buttons 342, 343, 344 and 345 which are common to the master telephone. Said button energizes a ringer at the desired station. The party desired then comes to the telephone and removes his receiver, which act places him in direct connection with the main line-conductors, and at the same time cuts the master telephone and all the other sub-stations (members of said line) out of service for the time being and until he restores his receiver to the hook. For instance, assuming that the line connected with the master station F is #220, and that the subscriber at sub-station #120 wishes to communicate with a party at sub-station E of the line in question he will begin the call by first removing his receiver 15 from the hook, pressing the vertical-button twice, the rotary-button once, then again the vertical twice and the rotary once, and for the last time the vertical ten times and the rotary once. In this way the respective vertical and rotary line-conductors 400 and 401 are grounded a number of times corresponding to the number of times that the buttons were pressed. It will be remembered that attention was called to the fact that as soon as the switch-hook is relieved of the weight of the receiver, the switch-hook rises and permits the ground-springs 22 and 23 to close. The union of these two springs completes a circuit from the ground-post 24 through the conductors 402 and 403 and the said springs to the ground-terminal $G^1$. The spring 30, on being pressed twice against the ground-post 24, then causes the vertical-line-relay 69 of the "first-selector" A to be twice energized. As a result, the relay-armature 70 is at once attracted. The path that the current takes through the said relay extends from ground-terminal $G^1$ through a circuit, already described, to the ground-post 24, thence through the spring 30 to the vertical-line-conductor 400, and through the side-switch-wiper 103, contact-point 125, conductor 404, vertical-line-relay 69, conductor 405, bridge-cut-off-relay-springs 153 and 154, conductors 406, 407 and 408 to the non-grounded terminal of battery B to ground G. The vertical-line-relay-armature is attracted only once to press the spring 71 into contact with the ground-spring 72. A second circuit is then completed through the vertical-magnet 76 which energizes the latter. The current in this last circuit passes from ground $G^2$ through the springs 72 and 71 and through the conductor 409 to the private-springs 113 and 112, thence through the conductor 410, vertical-magnet 76, and conductors 411, 412, 413 and 408 to the non-grounded terminal of battery B and to ground G. The vertical-magnet attracts its armature twice and raises the shaft 52 two steps, one step at a time. At the first step the vertical-pawl engages with one of the circular-teeth 60 and raises the shaft the first step. At the same time that the pawl 81 engages the said teeth the L-shaped piece 84 disengages the release-link 85 from the double-dog 91 which latter, under the force of the retracting-spring 155, rotates about its pivots so that the vertical-dog 93 falls into the groove under the first or uppermost tooth. Then when the vertical-armature and pawl return to their normal positions the shaft is prevented from falling to its original position. At the next step the shaft is raised one more notch and the vertical-dog engages with the next tooth so that at the end of the second operation the shaft-wipers are raised to the second level opposite the first contact of the second row of their respective banks. The subscriber next presses the rotary-button 29 once. Upon forcing the spring 31 onto the ground-post 24, he completes an energizing-circuit that only once magnetizes the rotary-line-relay 73 of the "first-selector" A. The current flows, in this case, from ground $G^1$ to the ground-post 24, thence through the spring 31, rotary-line-conductor 401, side-switch-wiper 104, contact-point 126, conductor 411ª, rotary-line-relay 73, conductor 412ª, bridge-cut-off-relay-springs 152, 153 and 154, through battery B to ground G. The energizing of said relay causes the armature 74 to close the springs 72 and 75, completing in turn a circuit through the private-magnet 107. The private-magnet, being thus energized, attracts its armature 108. At the downward stroke of the latter the escapement-finger 105 disengages from the lowermost tooth 119 and falls against the upper rearmost tooth 117 of the spring 115 with which tooth the escapement-finger disengages in turn as the private-armature returns to its normal position. At that instant the side-switch is drawn into second position and the lug 106, striking the cam 56, brings the side-switch to a standstill. The side-switch now has the escapement-finger between the teeth 119 and 120, and the side-switch-wipers 101, 102, 103 and 104 closed on the contact-points 127, 128, 129 and 130, respectively.

At the instant that the side-switch-wiper 101 closes with the contact-point 127, another energizing-circuit is completed through the rotary-magnet 131. The path of said current extends from ground $G^2$ to the contact-point 127 and through the side-switch-wiper 101, conductor 414, magnet-coil 133, interrupter-springs 136 and 137, rotary-magnet-coil 132, conductors 412, 413 and 408 through battery B and to ground G. The rotary-armature is thus attracted by the rotary-magnet 131, and the shaft 52 is rotated one step by the rotary-pawl 140. As the rotary-dog 94 rises to the crest of the first longitudinal tooth, and just before the shaft has rotated enough to permit the rotary-dog to fall behind the first longitudinal tooth, the shaft-rest 62 being opposite the groove or throat of the second circular-tooth, passes into said groove or throat and catches the shaft when the vertical-dog 93 is withdrawn from engagement with the second tooth. At the same time that the shaft is rotated the private-armature 108 is depressed by the rotary-armature-finger 138, so that the escapement-tooth 120 is drawn below the lower edge of the escapement-finger 105, at which instant the latter passes into engagement with the outer upper tooth 118, with which latter it disengages as soon as the private-armature is permitted to return to its normal position by the rotary-armature-finger 138. As soon as the side-switch-finger clears the escapement-tooth 118 altogether, it is drawn forward into the third position, at which time it meets the side-switch-stop 143ª, and against which it rests. As the rotary-armature returns to its normal position the interrupter-springs again reëngage, and the energizing-circuit through the rotary-magnet 131 would be reëstablished were it not that by the time the reëngagement occurs the side-switch has passed into the third position, as described, and the side-switch-wiper 101 is no longer in contact with the contact-point 127. As soon as the side-switch passes into the third position the private-wiper 55 is connected to ground through the conductor 415, back-release-relay 147, conductor 416ª, side-switch-wiper 102, contact-point 144, to the ground-terminal G⁴. This connection is between the private-wiper and the ground and, therefore, with the grounded terminal of the battery B. It establishes at the private-contact with which the private-wiper 55 is engaged, as well as at all other private-contact-points connected in multiple with it, a guarding potential which, in a manner to be disclosed, protects the trunk-lines secured by the line-wipers 53 and 54 from being seized by any other "first-selector" that may be seeking an idle trunk-line along the second level of any bank connected in multiple with the bank 50. Upon the completion of the operation just described, the subscribers' line-conductors 400 and 401 are extended, respectively, through the vertical and rotary side-switch-wipers 103 and 104 and through the vertical and rotary line-wipers 53 and 54, the trunk-lines that lead from the first terminal of the second level of the bank 50, similar to the trunk-lines 416 and 417, illustrated in connection with the tenth terminal of the same level of the said banks, to an idle "connector". The rotation of the shaft 52, however, does not always terminate as soon as the wipers are cut onto the first terminal of the level to which they may have been raised. For instance, should there be at the same time nine "first-selectors", each with its wipers engaging a different one of the first nine sets of trunks of the second level of the banks in multiple with banks 50 and 51, there would be a guarding potential at each one of the first nine private-bank-contacts of the second row, for reasons similar to those set forth in connection with the "first-selector" A, when the side-switch of the latter passed into third position, and when the side-switch-wiper 102 became connected with the ground-contact-point 144. Assuming that the first nine contacts of the second level of the above described group are connected to ground, then when the calling subscriber grounds the rotary side of the line by pressing the rotary-button 29, the side-switch trips into the second position; but the rotation of the shaft will begin and continue until the wipers have been carried beyond the last of the first nine terminals which are busy—that is, onto the tenth terminal of the second level of the banks 50 and 51.

The energizing-circuit through the rotary-magnet being closed, as was pointed out, at the time the side-switch-wiper 101 engages with the contact-point 127, the rotary-armature is attracted by the rotary-magnet 131, and the shaft rotated one step, so that the line and private wipers are rotated into engagement with the first terminal of the second level of their respective banks. There being a guarding potential at the first contact which the private-wiper meets, a circuit is completed through the private-magnet 107, which extends from the grounded terminal of battery B, through the private-wiper of whatever "first-selector" is occupying the first trunk position of the second level, and through the bank multiplying conductors to the contact-point with which the private-wiper 55 has engaged, thence through the private-wiper 55 and conductor 415, winding of the back-release-relay 147, conductor 416ª, the side-switch-wiper 102, contact-point 128, conductors 418 and 419, private-magnet 107, conductors 420, 413 and 408 to the non-grounded terminal of battery B and to ground G. Therefore, when the rotary-armature 134 and finger 138 return to their positions, after the interrupter-finger 135 has destroyed the energizing circuit through the rotary-magnet, the private armature, being attracted, does not follow the said rotary-armature-finger, and, therefore, the side-switch is retained in the second position, even after the completion of the first rotary step of the shaft 52, because of the energized condition of the private-magnet, and because the escapement-finger 105 is held by the outer upper escapement-tooth 118. The side-switch-wiper 101 being, therefore, retained in engagement with the grounded contact-point 127, as soon as the interrupter-springs reëngage, the energizing circuit through the rotary-magnet is once more completed. As a result the rotary armature is attracted again, the shaft is rotated one more step, and the private-wiper 55 is pushed onto the second terminal of the second level of the private-bank. Said contact-point also being grounded, the energizing circuit through the private-magnet is still maintained, so that the side-switch is not liberated when the rotary-armature again returns to its normal position. Clearly, then, the shaft will be rotated in a step-by-step manner as long as the private-wiper 55 continues to meet with grounded private-bank-contacts. After having been rotated onto the ninth contact, the private-wiper is then rotated one more step and into engagement with the tenth contact of the second level. This last contact, being without guarding potential, the magnetizing-circuit through the private-magnet is broken. This occurs at just about the point when the rotary-armature is at the end of its forward stroke, so that the private-armature, when released by the magnetic force that has disappeared from the private-magnet, falls back upon the rotary-armature-finger and follows the rotary-armature to normal position. Between the time that the private-armature is released by the private-magnet and the time when the rotary-armature fully regains its normal position, the escapement-finger 105, which has, during the rotation of the shaft, been resting against the foremost tooth of the upper escapement-spring, disengages from said tooth and passes into the third position, and at the same time the side-switch-wiper 101 leaves the contact-point and passes to the third position, in engagement with the contact-point 143. This occurs before the interrupter-springs 136 and 137 reëngage, so that the circuit through the rotary-magnet is permanently broken in order that no further rotation of the shaft may take place. The side-switch being in the third position, the subscribers' line-conductors 400 and 401 are extended through the vertical and rotary line-wipers 53 and 54, respectively, and through the vertical and rotary trunk-conductors 416 and 417 to the "connector" C, as shown in Fig. 5. The subscriber's line being extended to the "connector," he presses the vertical-button 28 twice for the second digit, and again grounds the vertical-line-conductor twice, and thus twice operates the vertical-line-relay 215 of the "connector" C. The path of this current may be traced from the ground-terminal $G^1$ at the substation #120 to the ground-post 24, through the spring 30, vertical-line-conductor 400, side-switch-wiper 103 of the "first-selector" A, contact-point 145, conductor 421, vertical-line-wiper 53, trunk-conductor 416, vertical-line-relay 215, conductors 421$^a$, 422, 423, 424, 425 and 426 and through battery B to ground G.

When the vertical-line-relay of the "connector" attracts its armature 217 the latter forces the line-relay-spring 219 against a ground-spring 221. As a result, the vertical-magnet 211 is energized twice in succession, and the "connector-shaft" 200 is raised two steps. The current through this magnet passes from the ground-terminal $G^5$ through the springs 221 and 219, conductor 427, private-springs 246 and 245, conductor 428, side-switch-wiper 254, conductor 429, vertical-magnet 211, conductors 423, 424, 425 and 426 through battery B and to ground G. Upon the first movement of the vertical-arm 224, the release-link 226 is disengaged from the double-dog 230 by the L-shaped piece 225, and the vertical-pawl 223 engages one of the circular-teeth and raises the shaft so that the vertical-dog catches the shaft in its raised position in a manner described in connection with the "first-selector-shaft". At the second operation of the vertical-armature 222 the shaft is raised a second step and retained there. The vertical-button 28 having been pressed twice, the subscriber again presses the rotary-button 29 once, and by grounding the rotary-line-conductor 401 causes an energizing-current to flow through the rotary-line-relay 216 of the "connector" for a moment. The energizing-current flows from the ground-terminal $G^1$ to the ground-post 24, thence over the rotary-line-conductor 401 through the "first-selector-side-switch-wiper" 104, contact-point 146, conductor 430, rotary-line-wiper 54, rotary-trunk-conductor 417, rotary-line-relay 216, conductors 422, 423, 424, 425 and 426, through battery B and to ground G. The rotary-line-relay being thus magnetized once, its armature 218 is attracted once, and forces the springs 220 and 221 into contact. This last operation closes the energizing-circuit of the private-magnet 213, which circuit extends from ground $G^5$ through the springs 221 and 220, conductor 431, private-magnet 213, and conductor 426, to the non-grounded terminal of battery B and to ground G. The private-magnet being energized the private-armature 239 is attracted once. The escapement-finger 250 clearing the escapement-tooth 242 at the downward stroke of the armature, and the upper escapement-tooth 240 at the return stroke, the side-switch is brought into second position and stopped there as the lug 251 strikes the cam 204. The side-switch-wiper 254, having left the contact-point 258, is then in engagement with the contact-point 259 instead, so that when the subscriber next presses the vertical-button 28 ten times and energizes the vertical-line-relay 215 ten times, the rotary-magnet 212, instead of the vertical-magnet 211, is magnetized ten times. The energizing-circuit through the rotary-magnet comes from the ground-terminal $G^5$ and extends, as above, through the springs 221 and 219 to the side-switch-wiper 254, but then passes, instead, through the contact-point 259 to the conductor 432 and thence through the rotary-magnet 212, conductors 425 and 426 to the non-grounded terminal of battery B and to ground G. The rotary-armature 236 is then attracted ten times, once each time that the rotary-magnet is magnetized. Each time that this armature it attracted, the rotary-pawl 238 engages with the longitudinal-teeth 205 and rotates the shaft one step in the same way that the "first-selector-rotary-magnet" rotated the "first-selector-shaft". Upon the first circular step the shaft-rest 209 cuts into engagement with the circular-teeth and catches the shaft when the vertical-dog is drawn out of engagement at the time that the rotary-dog reaches the crest of the circular-tooth over which it has to pass at such time; but by the time that the rotary-armature strikes the rotary-magnet-pole-pieces, the said rotary-dog then drops into locking engagement with the longitudinal-teeth, thus retaining the shaft in its advanced rotary position. At the first rotary step the shaft-wipers 201 and 202 and the private-wiper 203 pass onto the first contacts of the second level of their respective banks. At the second step the said wipers are pushed onto the second contact; and so on, step-by-step, until they reach the tenth contact of their respective banks. The last step of the calling subscriber in completing his connection is to again ground the rotary-line-conductor 401 once by pressing the rotary-button 29 once. Again the rotary-line-relay is energized, and again the private-magnet 213 only once attracts its armature 239. The shaft having been rotated so that the cam 204 no longer forms an obstruction to the side-switch-arm 249, at the downward stroke of the private-armature the escapement-finger 250 clears the tooth 243, and when the private-armature returns the upper tooth 241 is also cleared, and at this instant the side-switch springs into third position.

The line-wipers having been previously set on the tenth terminal of the second level of the line-bank 290, which terminal constitutes the terminal of the normal-conductors 433 and 434 that are bridged across the subscribers' line-conductors 435 and 436, it will be seen that as soon as the side-switch-wipers 256 and 257 close with the contact-points 266 and 269, respectively, the extended subscribers' line-conductors 416 and 417 are placed in connection with said normal-conductors and, therefore, with the desired line. The vertical-trunk-conductor 416 connects with the vertical-normal-conductor, 433, through the condenser 291, conductor 437, ringer-relay-springs 278 and 279, side-switch-wiper 256, conductor 438 and vertical-line-wiper 201; while the rotary-trunk-conductor 417 is connected with the rotary-normal-conductor 434 through the condenser 292, conductor 439, ringer-relay-springs 275 and 276, side-switch-wiper 257, conductor 440 and the rotary-line-wiper 202. The passage of the side-switch to the third position not only completes the connection thus described, but at the same time connects, as the side-switch-wiper 255 passes onto the contact-point 263, the private-wiper 203 with the ground-terminal G⁶. This connection establishes a guarding potential at the tenth private-contact of the second level of the private-bank 293, and at all other private-contacts in multiple therewith, in order that no other "connector" may be able to connect with the same line as long as said guarding potential is maintained. Furthermore, this guarding potential forces a current through the bridge-cut-off-relay 375 of the "first-selector" D, which relay, through its armature, controls the bridge-cut-off-relay-springs 376, 377 and 378. This latter relay, when magnetized, separates the said springs from each other and thereby opens up a bridged circuit that normally exists through the vertical and rotary line-relays 379 and 380 of the "first-selector" D, across the line-conductors 435 and 436, and at the same time interrupts a connection between said relays and the non-grounded terminal of battery B, which terminal is directly connected with the spring 376. Since the conductors 435 and 436 are included in the main talking-circuit, as will be hereinafter explained, one being on one side and the other being on the other, it is desirable to remove all unnecessary bridged connections between them, for obvious reasons. The connection between the calling and the called line having been established, the calling party is now ready to signal the called line. Right here it may be stated that if for any reason the calling line is busy when called, a guarding potential will release the calling "connector." For instance, if the line #220 had been called by any other "connector," there would be a guarding potential at the tenth private-contact of the second level of the private-bank 293, said contact corresponding to the trunk-lines 433 and 434 that lead from the tenth terminal of the second level of the line-bank 290. Were the said line made busy by reason of the "first-selector" D being in use, the said private-contact would be connected to ground at the instant that the normal-post-arm 381 on the shaft of the "first-selector" D permits the off-normal-spring 382 to engage with the grounded contact-point 383, by way of the private-normal-conductor 441 to the contact-point in question. The private-wiper 203 finding such a guarding potential at the instant that the calling subscriber grounds the rotary-line 401, it is evident that on pressing the rotary-button 29 for the last time the "connector" is released, and the subscriber fails to make the desired connection. The release occurs because of the energization of the release-magnet under such conditions, while the side-switch is in second position, said position being the proper position for the side-switch before the rotary-line-conductor is grounded for the last time. The circuit over which the said release-magnet is energized extends from the grounded terminal of battery B to the tenth contact of the second level of the private-bank, thence through the private-wiper 203, conductor 442, side-switch-wiper 255, contact-point 262, conductor 443, private-springs 247 and 248, conductors 444 and 445, the release-magnet 214, through battery B and to ground G. Of course, when the rotary-line is grounded by the calling subscriber the private-armature is attracted by the private-magnet, which latter becomes energized over circuits previously pointed out, so that the private-springs 247 and 248 are in contact at this time.

The "connector-release-magnet" being energized, the release-armature 227 withdraws the double-dog 230, and the lug 229 is caught and held in the aperture 231 on the end of said release-link. Of course, when the double-dog is thus rotated the locking-dogs 232 and 233 are withdrawn from the shaft which, being left free, is rotated back toward normal rotary position by the action of the coiled spring 208 until the normal-post-arm 207 strikes the normal-post 210. At that instant the shaft-support 209 enters the channel 294 and the shaft of necessity falls to its normal position. The release-armature 227, upon rotating the double-dog, also drives the side-switch to its first position by means of the side-switch-link 295 and the double-dog-release-arm 234. The calling subscriber, thinking that he has established connection, presses the signaling-button 34 at his sub-station, with the result that the spring 16 is separated from the contact-point 17 and closed in connection with the contact-point 35, and in this way the vertical-line-conductor 400 is connected with the ground $G^1$ by way of the ground-springs 22 and 23. The "connector" being released, and the side-switch-wiper 254 being restored into connection with the contact-point 255, the effect of the energizing of the vertical-line-relay at this stage is to raise the shaft of the "connector" vertically. By this action the normal-post-arm permits the normal-springs 272 and 273 to come into contact and permit a busy signaling current, provided by suitable means, to be sent over the line to the calling subscriber's station and through his receiver. Said busy signal notifies him that the desired line is busy. The busy current which is produced in the coil 296 passes through the conductor 446, to the contact-point 272, thence by way of the spring 273 and conductor 447 to the contact-point 267, side-switch-wiper 257, ringer-relay-springs 276 and 275, conductor 439, condenser 292, conductor 417, rotary-line-wiper 54, conductor 430, side-switch-wiper 104, rotary-line-conductor 401, spring 31, contact-point 33, receiver 15, secondary winding 14 of the induction-coil 10, contact-point 17, spring 16, springs 18 and 19, contact-point 32, spring 30, vertical-line-conductor 400, side-switch-wiper 103 of the "first-selector" A, conductor 421, vertical-line-wiper 53, vertical-trunk-conductor 416, vertical-line-relay 215 of the "connector" C, and back again to the coil 296. However, the subscriber not having found the line busy, and having completed his connection, as described, presses his signaling-button 34 and grounds the vertical-line-conductor 400, as stated, energizing the vertical-line-relay 215 of the "connector." The armature 217 of said relay then presses the springs 219 and 221 into engagement. The side-switch-wiper 254 being in third position, connected with the contact-point 260, the closure of said springs energizes as a result the ringer-relay 274. The energizing-current flows from the ground-terminal $G^5$ through the springs 221 and 219 to the side-switch-wiper 254, thence it takes a course through the contact-point 260 and through the ringer-relay 274 through battery B and to ground G. When the ringer-relay is energized it severs the springs 276 and 279 from all connection and then presses them into contact, respectively, with the springs 277 and 280. The ringer-generator H is, by this act, placed across the line-wipers 201 and 202 and, therefore, across the conductors of the called line. The ringing-current originates in the ringer-generator H and passes from the brush 281 to the springs 280 and 279, and to the side-switch-wiper 256, conductor 438, vertical-line-wiper 201, normal-conductor 433, line-conductor 435, relay 331, conductors 448 and 449, springs 329 and 327, conductor 450, spring 500, contact-point 501, switch-hook 502, spring 503, ringer 504, contact-point 505, spring 506, conductor 451, springs 326 and 328, conductors 452 and 453, relay 330, rotary-line-conductor 436, rotary-normal-conductor 434, wiper 202, conductor 440, side-switch-wiper 257, springs 276 and 277, through the brush 282 back to the generator H. The bell at the master station F being rung, the operator at that station, by removing his receiver 507 from the hook 502, interrupts the ringing-circuit at the point between the cam-arm 508 and the ringer-spring 503 and bridges the receiver across the conductors 450 and 451. As soon as the springs 509 and 510 come into contact the subscriber at the master station is in a position to speak with the subscriber at the calling sub-station. These two sub-stations, of course, are each provided with their respective induction-coils 10 and 511. The primary winding 9 of the former is included in a local primary circuit with the local battery 8, transmitter 7, and the local circuit-springs 11 and 12, which latter are subject to the operations of the switch-hook 2. The primary winding 512 of the second induction-coil 511 is similarly connected in series with the local battery $512^a$, the transmitter 513, and the local circuit-springs 514 and 515.

The connection between the two sub-stations connects in series the receivers 507 and 15 over conductors as follows: from the receiver 15 at the calling sub-station to the secondary winding 14 of the induction-coil, through the contact-point 17 to the spring 16 and thence through the secondary circuit-springs 18 and 19, contact-point 32, spring 30, vertical-line-conductor 400, side-switch-wiper 103 of the "first-selector" A, contact-point 145, conductor 421, vertical-line-wiper 53, vertical-trunk-conductor 416, condenser 291, conductor 437, ringer-relay-springs 278 and 279, side-switch-wiper 256 of the "connector," conductor 438, vertical-line-wiper 201, vertical-normal-conductor 433, vertical-line-conductor 435, line-relay 331 of the lock-out box, conductors 448 and 449, springs 329 and 327, conductor 450, contact-point 501, secondary springs 510 and 509, secondary winding 516 of the induction-coil 511, receiver 507, contact-point 505, spring 506, conductor 451, springs 326 and 328, conductors 452 and 453, rotary-line-relay 330, rotary-line-conductor 436, rotary-normal-conductor 434, rotary-line-wiper 202 of the "connector" C, conductor 440, side-switch-wiper 257, ringer-relay-springs 276 and 275, conductor 439, condenser 292, rotary-trunk-conductor 417, rotary-line-wiper 54 of the "first-selector" A, conductor 430, side-switch-wiper 104, rotary-line-conductor 401, spring 31, contact-point 33 and back to the receiver 15. Since the primary circuits at the two sub-stations thus connected are energized, and since the primary and secondary windings at each one of the stations are inductively related to each other, in a well-known manner, the subscribers at these two stations, through their respective receivers and transmitters, are able to communicate with each other in the usual manner. The calling subscriber will then inform the operator that he wishes a party at the sub-station E. The operator then presses the signaling-button 345 that rings the bell 525 at sub-station E. This energizing-circuit comprises the battery J which has one terminal grounded at G⁷. The current flows from the ground-terminal G⁸, through the bell 525, conductor 454, springs 518 and 517, and conductor 455 to the other terminal of the battery J. The subscriber at sub-station E removes his receiver 526 from the hook 527, which latter permits the springs 528 and 529 to come into contact. As soon as said springs close together a circuit is established from ground G¹⁰ through relay 300, locking-magnet 310, conductor 456, springs 337 and 336, conductor 457, springs 323 and 322, conductors 458 and 459, to the non-grounded terminal of the battery J. The current energizes, in its flow, the said relay 300 and the locking-magnet 310. The armature 304 is then attracted by the coil 300, pressing the springs 305 and 306 away from the coil 300, and placing the finger 316 on the side of the locking-finger 312 nearest the springs 307 and 308; and when the armature 309 is attracted by the locking-magnet 310 the connection between the springs 305 and 308 and the springs 306 and 307 is maintained. The fingers 346, 347 and 348, however, are met by their respective locking-fingers 313, 314 and 315, and the armatures 349, 350 and 351 are pressed in such a direction that the springs 352 and 353, 354 and 355, 356 and 357, break contact, respectively, with the springs 358 and 359, 360 and 361, 362 and 363. As soon as the locking-armature 309 is attracted the finger 321 is caught in the notch in the end of the release-armature 318, so that the release-armature 318 is permitted to be drawn away from the pole-piece of the release-magnet 317. At this time the springs 322 and 323 are separated, and the energizing-circuit through the relay 300 and the locking-magnet 310 is interrupted. The locking-armature 309, being attracted, forces the springs 326 and 327, respectively, away from the contact-points 328 and 329, at the same time permitting the spring 324ª to engage with the spring 325, which last two springs are normally disengaged. The separation of the springs 326 and 327 from the springs 328 and 329 removes the master station F from connection with the line-conductors 435 and 436. Therefore, when the subscriber at the sub-station E is ready to speak to the subscriber of the sub-station #120, only his talking apparatus of all the talking apparatus of sub-stations associated with the lock-out box is in connection with the line-conductors 435 and 436. Other sub-stations, similar to sub-station E, may be connected to the terminals K, L and M.

The bell 338 is provided with the lock-out mechanism shown in Fig. 1, and is used as a signal for the operator at the master station F so that he may know when the subscriber that he has signaled has responded. For instance, when the subscriber at sub-station E removes his receiver and causes the locking-armature 309 to be drawn up by the locking-magnet 310, the striker 339 is rotated against the bell 338 and produces a sound that constitutes the desired signal. From the preceding description it will be seen that as soon as the subscriber at the sub-station E answers, all the sub-stations connected with the lock-out box are disconnected from the main line-conductors 435 and 436, and are rendered inoperative for the time by their respective lock-out-relays 301, 302 and 303. The necessity for the bell 338 is evident, since the operator at the master station F has no other means of ascertaining whether the sub-station he is signaling responds or not, because if the called sub-station does respond the master station, in the manner pointed out, is disconnected from the circuit and is unable to communicate with the called station or with the calling station. The called subscriber, having connected his telephone with the line-conductors, is then in a position to speak with a subscriber at the calling sub-station, since the latter subscriber is still across the conductors 435 and 436, as already pointed out. The receiver at the sub-station E is then connected with said conductors over the conductor 460, through the secondary winding 530 of the induction-coil 531, contact-point 532 and spring 533, secondary springs 528ª and 529ª, the contact-point 534 and spring 535, and through the conductor 461 to the springs 305 and 308; the circuit then continues to the calling sub-station, through the receiver 15 at the said sub-station, and back to the conductor 453, thence through the springs 307 and 306, conductor 462, spring 536, contact-point 537 and back to the receiver 526. There being a transmitter 538 energized by a current from the local battery 539 in series with the primary winding 540 of the induction-coil 531, the two subscribers, the one at station #120 and the other at sub-station E, may now communicate. After the conversation is terminated, or at any desired time after the connection is completed, the subscriber at sub-station #120 may disconnect his line from the line leading to the called line in question, by simply restoring his receiver to the switch-hook 2. As the switch-hook descends, the three release-springs 25, 26 and 27 are forced into contact, grounding the vertical and rotary line-conductors 400 and 401 for a moment. The connection between the said line-conductors and the ground is completed from the ground-terminal G¹ through the ground-springs 22 and 23 and conductor 403 to the ground-release-spring 25, and thence through the springs 26 and 27 and contact-point 32 to the vertical-line-conductor, and at the same time from the ground-spring 25 to the spring 26, and by way of the contact-point 33 to the rotary-line-conductor 401. Over circuits that are already familiar, the vertical and rotary line-relays 215 and 216 of the "connector" C are energized simultaneously. Of the line-relay-springs under the control of said line-relays, the springs 219ª and 220ª are peculiarly adjusted. When the vertical-line-relay-armature is attracted, the spring 219ª flexes in the direction of the spring 220ª, and when the rotary-line-relay-armature 218 is attracted, the spring 220ª flexes in the direction of the first spring 219ª; but the said two springs do not come into contact unless both of them are operated simultaneously. This action being accomplished, upon the energization of the said line-relays in the instance under consideration, an energizing-circuit is completed that includes the release-magnet 214 of the "connector" C and the back-release-relay 147 of the "first-selector" A. The magnetizing-current for the latter circuit passes from the ground-point G⁴ to the contact-point 144 of the side-switch of the "first-selector", through the side-switch-wiper 102, conductor 416ª, back-release-relay 147, conductor 415, private-wiper 55, private-trunk-conductor 463, thence through the springs 219ª and 220ª, conductors 464 and 445, release-magnet 214, thence to the non-grounded terminal of battery B to ground G. At the instant that the release-armature 227 of the "connector" is attracted by said release-magnet, the double-dog is restored to its normal position, driving at the same time the side-switch to its first position, and depriving the shaft of the locking means provided by the locking-dog 233. In a manner already recited, the shaft 200 of the "connector" falls to its normal position, thus restoring all of the "connector" parts except the release-magnet-armature.

The energization of the back-release-relay of the "first-selector" closes the back-release-relay-springs 148 and 149 that complete a magnetizing circuit through the release-magnet 87 of the "first-selector". This current flows from the ground-point G⁹ through the springs 148 and 149, conductors 465 and 466, release-magnet 87, conductors 411, 412, 413 and 408 and through battery B to ground G. At once, the release-armature 86 is attracted, at which instant the release-link 85 is thrust forward sufficiently to catch the lug 90 on the double-dog. The release apparatus of the "first-selector" remains energized without restoring the side-switch until after the energizing-circuit is broken. As soon as the ground impulse over the line-conductors is interrupted, the rotary and vertical line-relays of the "connector" becoming deënergized permit their armatures to be restored, at which instant the springs 219ª and 220ª are forced apart, destroying the continuity of the circuit that includes the back-release-relay 147 and the release-magnet 214 of the "connector". Evidently, at such time, the release-armature 227 of the "connector" is restored, leaving said switch in readiness for further operation. When the back-release-relay 147 of the "first-selector" allows the springs 148 and 149 to separate, the release-magnet 87 becomes deënergized, and the retracting-spring 88 of the release-armature 86 draws the said armature back to its normal position, causing the double-dog 91 to be rotated about the pivots 92, moving the side-switch to its normal position with the escapement-finger 105 behind the escapement-tooth 119, and depriving the shaft 52 of the locking means furnished by the rotary-locking-dog 94. The "first-selector-shaft" falls to its normal position, forcing the off-normal-spring 64 away from the ground contact-point 65, thus depriving the "connector-bank" of the guarding potential, and closing the connection between the private-normal-conductor 467 and the bridge-cut-off-relay 150, producing a full restoration of said switch. The energizing-circuit through the bridge-cut-off-relay 375 of the called "first-selector" D, it will be remembered, comprises the side-switch-wiper 255 of the "connector" C, the private-wiper 203 and private-normal 441. Evidently, therefore, as soon as the "connector" is restored, this energizing-circuit is interrupted and the bridge-cut-off-relay of the "first-selector" D resumes its normal position, restoring the bridge-cut-off-relay-springs 376, 377 and 378 into contact. The "first-selector" A and the "connector" C being restored, as well as the bridge-cut-off-relay of the "first-selector" D, the subscriber at sub-station E completes the releasing operation by restoring his receiver to the hook. The springs 541, 542 and 543 being pressed into contact for a moment, the vertical and rotary line-conductors 461 and 462 are grounded in the usual way, causing the line-relays 331 and 330 to be magnetized simultaneously. The circuit through the vertical-line-relay 331 extends from the ground-terminal $G^{10}$ to the release-spring 541, and thence through the springs 542 and 543, contact-point 534, spring 535, conductor 461, springs 305 and 308, conductor 448, vertical-line-relay 331, vertical-line-conductor 435, side-switch-wiper 382, vertical-line-relay 379, springs 377 and 376, and through battery B to ground G. The energizing-circuit through the rotary-line-relay 330 extends from the ground-terminal $G^{10}$ to the spring 541, and thence through the spring 542, contact-point 537, spring 536, conductor 462, springs 306 and 307, conductor 453, relay 330, rotary-line-conductor 436, side-switch-wiper 385, rotary-line-relay 380 of the "first-selector" D, through the springs 378, 377 and 376 and through battery B to ground G. The line-relays 330 and 331 being magnetized simultaneously their armatures 332 and 333 are so attracted that the springs 334 and 335 are brought into connection and the springs 336 and 337 separated at the same time. The union of the springs 335 and 334 causes the energizing of the release-magnet 317, since the springs $324^a$ and 325 are closed at the time. The current in this circuit flows from the non-grounded terminal of battery J through the conductors 459 and 468, springs $324^a$ and 325, conductor 469, springs 334 and 335, release-magnet 317 and through the conductor 470 to the grounded terminal of battery J. The locking-magnet 310 being deënergized at the time, the locking-armature 309, as soon as the release-magnet 317 attracts its armature 318, returns to its normal position, since the finger 321 is liberated from engagement with the notch at the end of said release-armature. The force that restores the locking-armature 309 is furnished by the springs 325, 326 and 327, the tension in each of which has a tendency to rotate said locking-armature in such a direction that it will bring the locking-fingers 312, 313, 314 and 315 out of the way of the armature-fingers 316, 346, 347 and 348. As soon as said armature is restored the armatures 351, 350, 349, and 304 are permitted to return to their normal positions, restoring the springs under their control, and the springs 326 and 327 are permitted to return, respectively, into engagement with the contacts 328 and 329, while the springs $324^a$ and 325 are forced apart.

The springs 336 and 337 are provided and designed to be separated, when the release is initiated, to prevent a buzzing action that would be brought about through the combined action of the release-magnet 317 and the springs 322 and 323 and the release-armature 318. Were said springs 336 and 337 closed as the switch-hook descends, as soon as the springs 334 and 335 engage, the release-magnet 317 would attract its armature and permit the restoration of the locking-armature. This latter, as it falls back, interrupts the energizing-circuit through the release-magnet 317, at the springs $324^a$ and 325; but as soon as the springs 322 and 323 are brought into contact a circuit would then be reëstablished through the locking-magnet 310, from the non-grounded terminal of battery J, through the conductors 459 and 458, springs 322 and 323, conductors 457 and 456, locking-magnet 310, relay 300 to the ground $G^{10}$ at the station E. Said circuit would, of course, energize the locking-magnet 310 and cause the attraction of the locking-armature 309. Such an interference is not desirable, and for that reason the springs 336 and 337 are provided. Had the subscriber at sub-station E restored his receiver before the subscriber at station #120 restored his, the grounding of the line-conductors 435 and 436 would then have caused the energization of the lock-out box line-relays 330 and 331 through the back-release-circuit-relays 283 and 284, instead of through the line-relays 380 and 379 of the "first-selector" D, as before. The last two coils are not energized because of the energized state of the bridge-cut-off-relay 375. As soon as the relays 283 and 284 become energized the release-magnet 214 of the "connector" becomes energized and releases the "connector." The circuit in this case extends from ground $G^{11}$ through springs 287 and 289 to conductors 464 and 445, release-magnet 214 and through battery B to ground G. As soon as the shaft-wipers of the "connector" leave the bank-contacts the connection between the calling line and the called line is interrupted and the energizing-circuit to the bridge-cut-off-relay of the called "first-selector" D is broken. Then the "first-selector" is in readiness to call. Were there a sub-station similar to the sub-station E connected across the terminals M, and had the calling subscriber called for said station instead of the station E, the operator at the master telephone F would have pressed the button 342 instead of the button 345 which would have signaled the subscriber at said station. Upon removing his receiver, the called subscriber would have energized the locking-magnet 310, and thus locked out all of the other sub-stations, including the master station F, connected to the locking-box. A top view of a section of some of the locking devices connected with said box is shown in Fig. 6, where the release-armature is shown holding the locking-armature in its locked position. The springs of the relay 302 are shown locked out, while the relay 303 is indicated with a line closed in a manner essential during conversation. Fig. 7 shows the same apparatus released, while Fig. 8 is an end view of the latter. Should any subscriber at any sub-station connected with the lock-out box—station E, for instance—desire to make a call, he may do so by first removing his receiver, which act locks out all other sub-stations common to the line-conductors 435 and 436. Said subscriber, on removing his receiver, would energize the locking-relay 310, in a manner pointed out, and then proceeding to operate his calling device would ground his vertical and rotary line-conductors 435 and 436, respectively, in the manner described in connection with the sub-station #120. The conductors 448 and 453, being connected with the main line-conductors 435 and 436, respectively, and, therefore, with the vertical and rotary line-relays 380 and 379 of the "first-selector" D, his operations would be similar to those explained when the subscriber at station #120 called the line #220, except that instead of the "first-selector" A the "first-selector" D is operated. In their energizing-circuits the line-relays 331 and 330 of the lock-out box are in series, respectively with the vertical-line-relay 379 of the "first-selector" D, and the rotary-line-relay 380 of the same "first-selector". The line-relays of "first-selectors" are preferably of about 500 ohms resistance each, while those of the lock-out box are about 30 ohms each. Since he is then connected through to a "connector", in a manner similar to that shown in Fig. 5—where the sub-station #120 is connected with the "connector" C—the rotary-line-relay 330 of the lock-out box would be energized in series with the rotary-line-relay of the "connector" to which he is connected, while the vertical-line-relay 331 of the lock-out box would be energized in series with the vertical-line-relay of the said "connector". After the said subscriber has finished his call he may restore the switch and the lock-out box by replacing his receiver on the switch hook and thus grounding the vertical and rotary line conductors 435 and 436 in a manner previously described. Of course, after each restoration of the lock-out box the master station F is restored across the main line-conductors 435 and 436, and when thus restored the operator at said master station may perform a call—as well as any of the other sub-stations—since his vertical and rotary line-conductors 450 and 451 are also connected with the main conductors 435 and 436, respectively.

It is evident that our invention is especially useful in connection with a number of sub-stations located not very far from each other. The battery J shown in connection with the lock-out box may consist of a number of dry cells, or of any other suitable current source. The said lock-out box may be located in any suitable locality out of the way and connected directly with the main line-conductors 435 and 436 which, of course, are similar to the main line-conductors 400 and 401. The "first-selector" D, attached to said line, has nothing about it different from the "first-selector" A, and the normal-conductors 433 and 434 of the former have their counterparts in the normal-conductors 475 and 476. The relay mechanism of our lock-out box is mounted as a whole upon the base 390 of the box that contains it. The relays 300, 301, 302 and 303 are all secured to the upright 391; the lock-out magnet 310 to the piece 392; the line-relays 330 and 331 upon the angle-piece 393; and the release-relay 317 upon the angle-piece 394. All of the said supports are, of course, screwed to the said base 390. Therefore, our lock-out box has the advantage that it may be removed from one place to another with ease and facility and safety. Of course, any number of terminals similar to the terminals M and L and K may be provided in connection with our box; but with each terminal there must be a corresponding push-button, such as the push-buttons 342, 343, 344 and 345 in connection with the master station F.

The object of our improvement, as is evident, is to provide an arrangement whereby a number of automatic telephone extension sub-stations may use one main line in common without interfering with each other. Special provision is made in order that one of the stations connected with the lock-out box may be used as a master station, subservient to the other stations. Said master station can be provided with an operator for receiving all incoming calls, and who may signal the particular extension station desired from an outside source, through the medium of a local signaling system that comprises a set of push-buttons located at the master station.

Our improvement attains the object of restricting the use of the main line to the extension sub-station at which the receiver is removed from the switch-hook first: Having once secured the line, the operator at said sub-station, in calling, operates his calling device and the switch at the central office in a manner already described in connection with the sub-station #120 when the latter called the line #220. The line-relays 330 and 331 are in series with the main line-conductors, but are of a low impedance and low resistance, so that their presence between the lock-out box and the switches is not objectionable. Good results have been obtained by making said relays 30 ohms each, and by using relays such as the locking-out relay 300, locking-magnet 310, and the release-magnet 317 of about 8 ohms each. The battery J, it should be known, is usually of about 15 volts.

From the foregoing it will be seen that our invention is in the nature of an improvement on the party line telephone system described and claimed in prior application Serial No. 270,591, filed July 20, 1905; it is also obvious that our improved lock-out box arrangement is in its broader aspects equally applicable to either manual, automatic or semi-automatic telephone exchange systems. As illustrated, the lock-out box is applied to an arrangement of that character known as extension telephones—that is to say, a main or master telephone having one or more extensions leading therefrom and connecting with extension telephones.

It is evident that our invention is equally applicable to ordinary telephone party lines—that is to say, subscribers' lines whereon a plurality of subscribers are located and provided with means for using the line in common.

As illustrated, our invention is applied to an automatic telephone exchange system of that particular type in which each sub-station is provided with a connection to ground, these ground connections at the sub-stations being employed by the different subscribers in transmitting to the exchange the electrical impulses necessary for accomplishing the different switching and trunking and connecting operations. With this arrangement, the ground connections at the sub-stations (such as the extension stations illustrated) can be employed as the means for energizing the lock-out relays which are individual to the different extensions or sub-stations, and for then transmitting the impulses necessary for effecting a restoration of the lock-out box apparatus when the subscriber hangs up his telephone. In other words, with the arrangement shown, these ground connections at the subscribers' stations may, in the case of switches like the extension telephone E, serve not only as the means for enabling the subscriber to trunk through the exchange and connect himself with the called subscriber's line, and then signal the called subscriber, as well as effect a disconnection between lines after the subscribers have terminated their conversation, but also as the means for properly operating the lock-out box mechanism when the called subscriber at the extension station responds, and for then re-connecting all of the other extension telephones, and also the main or master telephone with the line as soon as the two subscribers are through talking and the extension subscriber hangs up his telephone.

With this arrangement, no extension telephone can be employed for listening-in or disturbing the connections after the line leading to the master telephone has once been put in use by any of the users of the different extension telephones. Obviously, however, as explained, our improved lock-out arrangement can be changed or modified more or less without departing from the spirit of our invention. It may, with such modification as may be necessary by different situations, be employed wherever a single line is employed by a plurality of subscribers in common.

It will be seen that the line consisting of the conductors 435 and 436 is in the nature of a trunk line, inasmuch as it is common to a group of subscribers located at a branch station. Each subscriber's telephone equipment at this branch station has a suitable telephone line leading to the trunk line, and with the arrangement shown the said telephone lines are normally connected with the said trunk line. The subscribers' individual magnets operate contacts which control the connection between the telephone lines and the trunk line, and any magnet is adapted to be energized to give the corresponding subscriber possession of the trunk line. The common magnet 310 is adapted to be energized to cut off all of the telephone lines except that of the calling subscriber, or of the called subscriber, as the case may be. It will be seen that this common magnet 310 is connected in multiple to the entire group of subscribers' stations or telephone equipments, and that it is adapted to be energized by any calling or called subscriber of the said group. When the said common magnet is energized it renders unresponsive all of the individual magnets except the one allotted to the calling or called subscriber, and thus the other subscribers are temporarily cut off from connection with the trunk line. With the arrangement shown the said other subscribers are cut off during the entire time that the calling or called subscriber is in possession of the trunk line. The arrangement can be varied, of course, for different purposes, and in any event all other telephone lines will be rendered inoperative for calling when one line calls, so that when a subscriber calls the others are temporarily cut off, regardless of whether or not they remain cut off during the entire time that the calling subscriber is in possession of the trunk line. These individual magnets, such as the magnets 300 to 303, inclusive, can be modified more or less, and used for different purposes, without departing from the spirit of our invention.

What we claim as our invention is:—

1. In a telephone system, the combination of a subscriber's line, a plurality of telephones connected with said line, means at each telephone for connecting the line with ground, an electromagnetically-controlled lock-out mechanism adapted to be operated by closing connection to ground at any telephone, said lock-out mechanism being adapted to disconnect from the line all of the telephones except the one in use, and a source of current for operating said lock-out mechanism.

2. In a telephone system, the combination of a subscriber's line, a plurality of telephones connected with said line, a normally-open ground connection at each telephone, and lock-out means adapted to be operated by the closure of any connection to ground, together with trunk-lines and trunk-selecting switch mechanism also adapted to be operated by electrical impulses produced through the medium of any one of said ground connections, said lock-out means being adapted to disconnect from the line all of the telephones except the one in use.

3. In a telephone system, the combination of a subscriber's line, a main or master telephone connected therewith, a plurality of extension telephones connected with the said line, a ground connection at each telephone, trunk-lines and trunk-selecting switch mechanism adapted to be operated by electrical impulses adapted to be transmitted through the medium of any of the ground connections, means under the control of the operator at the master telephone for producing an audible call-signal at any one of the extension telephones, and a lock-out mechanism adapted when any of said extension telephones is put in use to automatically disconnect from the line all of the other telephones connected therewith.

4. In a telephone system, the combination of a subscriber's line, a main or master telephone connected therewith, a plurality of extension telephones connected with the same line, a relay for each extension from the main line, said relays being adapted to control normally-closed connections between the main line and the extension telephones, a locking magnet adapted when energized to disconnect the master telephone from the main line, said locking magnet having an armature provided with locking projections, and said relays being provided with armatures having projections adapted to be engaged by the locking projections of the armature of the locking magnet.

5. In a telephone system, the combination of a line, a plurality of extensions therefrom, a normally-closed switch in each extension, relay-magnets having armatures adapted to control said switches, means for energizing any relay-magnet when its allotted extension is put in use, a locking magnet provided with an armature having portions adapted to engage the armatures of the said relays, and means whereby said locking magnet is also energized whenever any extension is put in use, said locking magnet being operated to open the switches of all extensions except the one put in use.

6. In a telephone system, the combination of a subscriber's line, a plurality of telephones connected with said line, a relay for each telephone, means whereby the use of any telephone causes the energizing of its allotted relay, an electro-magnet provided with an armature coöperating with all of said relays to disconnect all of the telephones except the one put in use, and means whereby the said magnet is always energized whenever a telephone is used.

7. In a telephone system, the combination of a subscriber's line, a main or master telephone connected with the line, a plurality of extension telephones connected with the said line, means for enabling the operator at the master telephone to produce an audible call-signal at any extension telephone, and additional signaling connections and devices for producing an audible signal for the operator at the master telephone as soon as the call is answered at the extension telephone.

8. In a telephone system, the combination of a subscriber's line, a main or master telephone connected with the line, a plurality of extension telephones connected with the same line, a locking magnet provided with an armature adapted to coöperate with the different relays in severing the connection between the main line and all of the extension telephones except the one put in use, a locking device for locking the said armature in its attracted position, a release-magnet for releasing said armature and thereby restoring all of the said extensions in connection with the main line, a pair of line-relays, and circuits for the said locking and release magnets, said circuits being controlled by said line-relays.

9. In a telephone system, the combination of a main line, several extensions therefrom, relays controlling said extensions, a locking magnet provided with an armature adapted to coöperate with said relays in severing connection between the main line and all of said extensions except the one in use, an auxiliary-switch operated by the said armature, a locking device for locking the armature in its attracted position, a release-magnet for releasing the armature, a couple of line-relays, an energizing circuit for said locking magnet controlled by one of said line-relays, an auxiliary-switch operated by said release-magnet and adapted for controlling said energizing circuit of the locking magnet, and an energizing circuit for the release-magnet controlled by the auxiliary-switch operated by the said armature.

10. In a telephone system, the combination of a main line, several extensions therefrom, a relay for each extension, a locking magnet provided with an armature adapted to coöperate with said relays in effecting a disconnection from the main line of all of the extensions except the one put in use, and a plurality of energizing circuits for said locking magnet, each energizing circuit including the winding of one of said relays.

11. In a telephone system, the combination of a subscriber's line, a plurality of telephones connected with said line, means at each telephone for connecting the line with ground, and a lock-out mechanism adapted to be operated by closing connection to ground at any telephone, said lock-out mechanism being adapted to disconnect from the line all of the telephones except the one in use, the said system also comprising electrically-propelled and step-by-step-actuated "connectors" for completing connection with the called subscriber's line, together with means under the control of any calling subscriber for producing an audible call-signal at a sub-station of the called subscriber's line.

12. In a telephone system, the combination of a subscriber's line, a plurality of telephones connected therewith, and a lock-out mechanism adapted automatically to disconnect all of the telephones from the line except the one in use, the said system also comprising electrically-propelled and step-by-step-actuated "connectors" for completing connection with the called subscriber's line, together with means under the control of any calling subscriber for producing an audible call-signal at a substation of the called subscriber's line.

13. In a telephone system, the combination of a subscriber's line, a plurality of telephones connected with said line, and lock-out means associated with one of said telephones and adapted to automatically disconnect from the line all of the telephones except the one in use, the said system also comprising electrically-propelled and step-by-step-actuated "connectors" for completing connection with the called subscriber's line, together with means under the control of any calling subscriber for producing an audible call-signal at a sub-station of the called subscriber's line.

14. In a telephone system, the combination of a subscriber's line, a plurality of telephones connected with said line, a normally-open ground connection at each telephone, and lock-out means adapted to be operated by the closure of any connection to ground, together with trunk-lines and trunk-selecting switch mechanism also adapted to be operated by electrical impulses produced through the medium of any one of said ground connections, said lock-out means being adapted to disconnect from the line all of the telephones except the one in use, the said system also comprising electrically-propelled and step-by-step-actuated "connectors" for completing connection with the called subscriber's line, together with means under the control of any calling subscriber for producing an audible call-signal at a sub-station of the called subscriber's line.

15. In a telephone system, the combination of a subscriber's line, a main or master telephone connected therewith, a plurality of extension telephones connected with the said line, a ground connection at each telephone, trunk-lines and trunk-selecting switch mechanism adapted to be operated by electrical impulses adapted to be transmitted through the medium of any of the ground connections, means under the control of the operator at the master telephone for producing an audible call-signal at any one of the extension telephones, and a lock-out mechanism adapted when any of said extension telephones is put in use to automatically disconnect from the line all of the other telephones connected therewith, the said system also comprising electrically-propelled and step-by-step-actuated "connectors" for completing connection with the called subscriber's line, together with means under the control of any calling subscriber for producing an audible call-signal at a sub-station of the called subscriber's line.

16. In a telephone system, the combination of a subscriber's line, a main or master telephone connected therewith, a plurality of extension telephones connected with the same line, a relay for each extension from the main line, said relays being adapted to control normally-closed connections between the main line and the extension telephones, a locking magnet adapted when energized to disconnect the master telephone from the main line, said locking magnet having an armature provided with locking projections, and said relays being provided with armatures having projections adapted to be engaged by the locking projections of the armature of the locking magnet, the said system also comprising electrically-propelled and step-by-step-actuated "connectors" for completing connection with the called subscriber's line, together with means under the control of any calling subscriber for producing an audible call-signal at a sub-station of the called subscriber's line.

17. In a telephone system, the combination of a line, a plurality of extensions therefrom, a normally-closed switch in each extension, relay-magnets having armatures adapted to control said switches, means for energizing any relay-magnet when its allotted extension is put in use, a locking magnet provided with an armature having portions adapted to engage the armatures of the said relays, and means whereby said locking magnet is also energized whenever any extension is put in use, said locking magnet being operated to open the switches of all extensions except the one put in use, the said system also comprising electrically-propelled and step-by-step-actuated "connectors" for completing connection with the called subscriber's line, together with means under the control of any calling subscriber for producing an audible call-signal at a sub-station of the called subscriber's line.

18. In a telephone system, the combination of a subscriber's line, a plurality of telephones connected with said line, a relay for each telephone, means whereby the use of any telephone causes the energizing of its allotted relay, an electro-magnet provided with an armature coöperating with all of said relays to disconnect all of the telephones except the one put in use, and means whereby the said magnet is always energized whenever a telephone is used, the said system also comprising electrically-propelled and step-by-step-actuated "connectors" for completing connection with the called subscriber's line, together with means under the control of any calling subscriber for producing an audible call-signal at a sub-station of the called subscriber's line.

19. In a telephone system, the combination of a subscriber's line, a main or master telephone connected with the line, a plurality of extension telephones connected with the said line, means for enabling the operator at the master telephone to produce an audible call-signal at any extension telephone, and additional signaling connections and devices for producing an audible signal for the operator at the master telephone as soon as the call is answered at the extension telephone, the said system also comprising electrically-propelled and step-by-step-actuated "connectors" for completing connection with the called subscriber's line, together with means under the control of any calling subscriber for producing an audible call-signal at a sub-station of the called subscriber's line.

20. In a telephone system, the combination of a subscriber's line, a main or master telephone connected with the line, a plurality of extension telephones connected with the same line, a locking magnet provided with an armature adapted to coöperate with the different relays in severing the connection between the main line and all of the extension telephones except the one put in use, a locking device for locking the said armature in its attracted position, a release-magnet for releasing said armature and thereby restoring all of the said extensions in connection with the main line, a pair of line-relays, and circuits for the said locking and release magnets, said circuits being controlled by said line-relays, the said system also comprising electrically-propelled and step-by-step-actuated "connectors" for completing connection with the called subscriber's line, together with means under the control of any calling subscriber for producing an audible call-signal at a sub-station of the called subscriber's line.

21. In a telephone system, the combination of a main line, several extensions therefrom, relays controlling said extensions, a locking magnet provided with an armature adapted to coöperate with said relays in severing connection between the main line and all of said extensions except the one in use, an auxiliary-switch operated by the said armature, a locking device for locking the armature in its attracted position, a release-magnet for releasing the armature, a couple of line-relays, an energizing circuit for said locking magnet controlled by one of said line-relays, an auxiliary-switch operated by said release-magnet and adapted for controlling said energizing circuit of the locking magnet, and an energizing circuit for the release-magnet controlled by the auxiliary-switch operated by the said armature, the said system also comprising electrically-propelled and step-by-step-actuated "connectors" for completing connection with the called subscriber's line, together with means under the control of any calling subscriber for producing an audible call-signal at a sub-station of the called subscriber's line.

22. In a telephone system, the combination of a main line, several extensions therefrom, a relay for each extension, a locking magnet provided with an armature adapted to coöperate with said relays in effecting a disconnection from the main line of all of the extensions except the one put in use, and a plurality of energizing circuits for said locking magnet, each energizing circuit including the winding of one of said relays, the said system also comprising electrically-propelled and step-by-step-actuated "connectors" for completing connection with the called subscriber's line, together with means under the control of any calling subscriber for producing an audible call-signal at a sub-station of the called subscriber's line.

23. In a telephone system, the combination of a subscriber's line, a plurality of telephones connected with said line, means at each telephone for connecting the line with ground, and a lock-out mechanism adapted to be operated by closing connection to ground at any telephone, said lock-out mechanism being adapted to disconnect from the line all of the telephones except the one in use, the said system also comprising automatic means for establishing a guarding potential for the line of any called subscriber, and for thereby precluding the automatic completion of a connection with any busy subscriber's line.

24. In a telephone system, the combination of a subscriber's line, a plurality of telephones connected therewith, and a lock-out mechanism adapted automatically to disconnect all of the telephones from the line except the one in use, the said system also comprising automatic means for establishing a guarding potential for the line of any called subscriber, and for thereby precluding the automatic completion of a connection with any busy subscriber's line.

25. In a telephone system, the combination of a subscriber's line, a plurality of telephones connected with said line, and lock-out means associated with one of said telephones and adapted to automatically disconnect from the line all of the telephones except the one in use, the said system also comprising automatic means for establishing a guarding potential for the line of any called subscriber, and for thereby precluding the automatic completion of a connection with any busy subscriber's line.

26. In a telephone system, the combination of a subscriber's line, a plurality of telephones connected with said line, a normally-open ground connection at each telephone, and lock-out means adapted to be operated by the closure of any connection to ground, together with trunk-lines and trunk-selecting switch mechanism also adapted to be operated by electrical impulses produced through the medium of any one of said ground connections, said lock-out means being adapted to disconnect from the line all of the telephones except the one in use, the said system also comprising automatic means for establishing a guarding potential for the line of any called subscriber, and for thereby precluding the automatic completion of a connection with any busy subscriber's line.

27. In a telephone system, the combination of a subscriber's line, a main or master telephone connected therewith, a plurality of extension telephones connected with the said line, a ground connection at each telephone, trunk-lines and trunk-selecting switch mechanism adapted to be operated by electrical impulses adapted to be transmitted through the medium of any of the ground connections, means under the control of the operator at the master telephone for producing an audible call-signal at any one of the extension telephones, and a lock-out mechanism adapted when any of said extension telephones is put in use to automatically disconnect from the line all of the other telephones connected therewith, the said system also comprising automatic means for establishing a guarding potential for the line of any called subscriber, and for thereby precluding the automatic completion of a connection with any busy subscriber's line.

28. In a telephone system, the combination of a subscriber's line, a main or master telephone connected therewith, a plurality of extension telephones connected with the same line, a relay for each extension from the main line, said relays being adapted to control normally-closed connections between the main line and the extension telephones, a locking magnet adapted when energized to disconnect the master telephone from the main line, said locking magnet having an armature provided with locking projections, and said relays being provided with armatures having projections adapted to be engaged by the locking projections of the armature of the locking magnet, the said system also comprising automatic means for establishing a guarding potential for the line of any called subscriber, and for thereby precluding the automatic completion of a connection with any busy subscriber's line.

29. In a telephone system, the combination of a line, a plurality of extensions therefrom, a normally-closed switch in each extension, relay-magnets having armatures adapted to control said switches, means for energizing any relay-magnet when its allotted extension is put in use, a locking magnet provided with an armature having portions adapted to engage the armatures of the said relays, and means whereby said locking magnet is also energized whenever any extension is put in use, said locking magnet being operated to open the switches of all extensions except the one put in use, the said system also comprising automatic means for establishing a guarding potential for the line of any called subscriber, and for thereby precluding the automatic completion of a connection with any busy subscriber's line.

30. In a telephone system, the combination of a subscriber's line, a plurality of telephones connected with said line, a relay for each telephone, means whereby the use of any telephone causes the energizing of its allotted relay, an electro-magnet provided with an armature coöperating with all of said relays to disconnect all of the telephones except the one put in use, and means whereby the said magnet is always energized whenever a telephone is used, the said system also comprising automatic means for establishing a guarding potential for the line of any called subscriber, and for thereby precluding the automatic completion of a connection with any busy subscriber's line.

31. In a telephone system, the combination of a subscriber's line, a main or master telephone connected with the line, a plurality of extension telephones connected with the said line, means for enabling the operator at the master telephone to produce an audible call-signal at any extension telephone, and additional signaling connections and devices for producing an audible signal for the operator at the master telephone as soon as the call is answered at the extension telephone, the said system also comprising automatic means for establishing a guarding potential for the line of any called subscriber, and for thereby precluding the automatic completion of a connection with any busy subscriber's line.

32. In a telephone system, the combination of a subscriber's line, a main or master telephone connected with the line, a plurality of extension telephones connected with the same line, a locking magnet provided with an armature adapted to coöperate with the different relays in severing the connection between the main line and all of the extension telephones except the one put in use, a locking device for locking the said armature in its attracted position, a release-magnet for releasing said armature and thereby restoring all of the said extensions in connection with the main line, a pair of line-relays, and circuits for the said locking and release magnets, said circuits being controlled by said line-relays, the said system also comprising automatic means for establishing a guarding potential for the line of any called subscriber, and for thereby precluding the automatic completion of a connection with any busy subscriber's line.

33. In a telephone system, the combination of a main line, several extensions therefrom, relays controlling said extensions, a locking magnet provided with an armature adapted to coöperate with said relays in severing connection between the main line and all of said extensions except the one in use, an auxiliary-switch operated by the said armature, a locking device for locking the armature in its attracted position, a release-magnet for releasing the armature, a couple of line-relays, an energizing circuit for said locking magnet controlled by one of said line-relays, an auxiliary-switch operated by said release-magnet and adapted for controlling said energizing circuit of the locking magnet, and an energizing circuit for the release-magnet controlled by the auxiliary-switch operated by the said armature, the said system also comprising automatic means for establishing a guarding potential for the line of any called subscriber, and for thereby precluding the automatic completion of a connection with any busy subscriber's line.

34. In a telephone system, the combination of a main line, several extensions therefrom, a relay for each extension, a locking magnet provided with an armature adapted to coöperate with said relays in effecting a disconnection from the main line of all of the extensions except the one put in use, and a plurality of energizing circuits for said locking magnet, each energizing circuit including the winding of one of said relays, the said system also comprising automatic means for establishing a guarding potential for the line of any called subscriber, and for thereby precluding the automatic completion of a connection with any busy subscriber's line.

35. In a telephone system, the combination of a subscriber's line, a plurality of telephones connected with said line, means at each telephone for connecting the line with ground, and a lock-out mechanism adapted to be operated by closing connection to ground at any telephone, said lock-out mechanism being adapted to disconnect from the line all of the telephones except the one in use, the said system also comprising suitable auxiliary-release-circuits and devices for effecting a disconnection between lines after the subscribers are through talking.

36. In a telephone system, the combination of a subscriber's line, a plurality of telephones connected therewith, and a lock-out mechanism adapted automatically to disconnect all of the telephones from the line except the one in use, the said system also comprising suitable auxiliary-release-circuits and devices for effecting a disconnection between lines after the subscribers are through talking.

37. In a telephone system, the combination of a subscriber's line, a plurality of telephones connected with said lines, and lock-out means associated with one of said telephones and adapted to automatically disconnect from the line all of the telephones except the one in use, the said system also comprising suitable auxiliary-release-circuits and devices for effecting a disconnection between lines after the subscribers are through talking.

38. In a telephone system, the combination of a subscriber's line, a plurality of telephones connected with said line, a normally-open ground connection at each telephone, and lock-out means adapted to be operated by the closure of any connection to ground, together with trunk-lines and trunk-selecting switch mechanism also adapted to be operated by electrical impulses produced through the medium of any of said ground connections, said lock-out means being adapted to disconnect from the line all of the telephones except the one in use, the said system also comprising suitable auxiliary-release-circuits and devices for effecting a disconnection between lines after the subscribers are through talking.

39. In a telephone system, the combination of a subscriber's line, a main or master telephone connected therewith, a plurality of extension telephones connected with the said line, a ground connection at each telephone, trunk-lines and trunk-selecting switch mechanism adapted to be operated by electrical impulses adapted to be transmitted through the medium of any of the ground connections, means under the control of the operator at the master telephone for producing an audible call-signal at any one of the extension telephones, and a lock-out mechanism adapted when any of said extension telephones is put in use to automatically disconnect from the line all of the other telephones connected therewith, the said system also comprising suitable auxiliary-release-circuits and devices for effecting a disconnection between lines after the subscribers are through talking.

40. In a telephone system, the combination of a subscriber's line, a main or master telephone connected therewith, a plurality of extension telephones connected with the same line, a relay for each extension from the main line, said relays being adapted to control normally-closed connections between the main line and the extension telephones, a locking magnet adapted when energized to disconnect the master telephone from the main line, said locking magnet having an armature provided with locking projections, and said relays being provided with armatures having projections adapted to be engaged by the locking projections of the armature of the locking magnet, the said system also comprising suitable auxiliary-release-circuits and devices for effecting a disconnection between lines after the subscribers are through talking.

41. In a telephone system, the combination of a line, a plurality of extensions therefrom, a normally-closed switch in each extension, relay-magnets having armatures adapted to control said switches, means for energizing any relay-magnet when its allotted extension is put in use, a locking magnet provided with an armature having portions adapted to engage the armatures of the said relays, and means whereby said locking magnet is also energized whenever any extension is put in use, said locking magnet being operated to open the switches of all extensions except the one put in use, the said system also comprising suitable auxiliary-release-circuits and devices for effecting a disconnection between lines after the subscribers are through talking.

42. In a telephone system, the combination of a subscriber's line, a plurality of telephones connected with said line, a relay for each telephone, means whereby the use of any telephone causes the energizing of its allotted relay, an electro-magnet provided with an armature coöperating with all of said relays to disconnect all of the telephones except the one put in use, and means whereby the said magnet is always energized by the said magnet is always energized whenever a telephone is used, the said system also comprising suitable auxiliary-release-circuits and devices for effecting a disconnection between lines after the subscribers are through talking.

43. In a telephone system, the combination of a subscriber's line, a main or master telephone connected with the line, a plurality of extension telephones connected with the said line, means for enabling the operator at the master telephone to produce an audible call-signal at any extension telephone, and additional signaling connections and devices for producing an audible signal for the operator at the master telephone as soon as the call is answered at the extension telephone, the said system also comprising suitable auxiliary-release-circuits and devices for effecting a disconnection between lines after the subscribers are through talking.

44. In a telephone system, the combination of a subscriber's line, a main or master telephone connected with the line, a plurality of extension telephones connected with the same line, a locking magnet provided with an armature adapted to coöperate with the different relays in severing the connection between the main line and all of the extension telephones except the one put in use, a locking device for locking the said armature in its attracted position, a release-magnet for releasing said armature and thereby restoring all of the said extensions in connection with the main line, a pair of line-relays, and circuits for the said locking and release magnets, said circuits being controlled by said line-relays, the said system also comprising suitable auxiliary-release-circuits and devices for effecting a disconnection between lines after the subscribers are through talking.

45. In a telephone system, the combination of a main line, several extensions therefrom, relays controlling said extensions, a locking magnet provided with an armature adapted to coöperate with said relays in severing connection between the main line and all of said extensions except the one in use, an auxiliary-switch operated by the said armature, a locking device for locking the armature in its attracted position, a release-magnet for releasing the armature, a ccuple of line-relays, an energizing circuit for said locking magnet controlled by one of said line-relays, an auxiliary-switch operated by said release-magnet and adapted for controlling said energizing circuit of the locking magnet, and an energizing circuit for the release-magnet controlled by the auxiliary-switch operated by the said armature, the said system also comprising suitable auxiliary-release-circuits and devices for effecting a disconnection between lines after the subscribers are through talking.

46. In a telephone system, the combination of a main line, several extensions therefrom, a relay for each extension, a locking magnet provided with an armature adapted to coöperate with said relays in effecting a disconnection from the main line of all the extensions except the one put in use, and a plurality of energizing circuits for said locking magnet, each energizing circuit including the winding of one of said relays, the said system also comprising suitable auxiliary-release-circuits and devices for effecting a disconnection between lines after the subscribers are through talking.

47. In a telephone system, the combination of a subscriber's line, and a master telephone connected therewith, a plurality of extension telephones connected with said line, a ground connection at said master telephone, trunk-lines, trunk-selecting switching mechanism adapted to be operated while the extension telephones are out of use, by electrical impulses transmitted through the medium of the ground connection, means under the control of the operator at the master telephone for producing an audible call-signal at any one of the extension telephones, and a lock-out mechanism adapted when any of said extension telephones is put in use to automatically disconnect from the line all of the other telephones connected therewith.

48. In a telephone system, the combination of a main line, several extensions therefrom, a relay for each extension, a locking magnet provided with an armature adapted to coöperate with the said relays in severing connection between the main line and all of the said extensions except the one in use, a plurality of auxiliary switches operated by the armature of the said locking magnet, a locking device for locking the armature in its attracted position, a release-magnet for releasing the armature, a master station connected to the main line through one of the said auxiliary switches, a couple of line-relays, an energizing circuit for said locking magnet controlled by one of said line-relays, an auxiliary switch operated by said release-magnet and adapted for controlling said energizing circuit of the locking magnet, and an energizing circuit for the release magnet controlled by one of the auxiliary switches operated by the said armature.

49. In a telephone system, the combination of a main line, a lock-out means, a plurality of extension telephones connected through the lock-out means to the line, a master telephone station connected with said lock-out means and with said line, a ground connection at each telephone, two line-relays, a plurality of energizing circuits through said line-relays, each energizing circuit comprising the ground at each telephone, a signaling means at said master station under the control of a calling subscriber for producing an audible call-signal at the master telephone station when any telephone on the called line is desired, means for enabling the operator at the master telephone to produce an audible call-signal at any extension telephone, and additional signaling connections and devices for producing an audible signal at the lock-out means as soon as the call is answered.

50. In a telephone exchange system, the combination of a trunk line, relays in said line, operating circuits controlled by said relays, another line automatic means for trunking said other line into connection with said trunk line, the said relays being located at a branch station on said trunk line, and a plurality of telephones normally connected with said trunk line.

51. A telephone system comprising a trunk line, a plurality of telephone lines, as many electromagnets as there are telephone lines, means operated by said magnets and controlling connection between said telephone lines and the trunk line, and an electromagnet provided with means for opening all other telephone lines when one telephone line calls over the trunk line.

52. A telephone system comprising a trunk line, a plurality of telephone lines, an individual electromagnet for each line, line circuits for energizing said magnets when the subscribers call, a common magnet controlling all of said magnets, and means by which said common magnet is automatically energized to render inoperative all individual magnets except that of the calling subscriber.

53. A telephone system comprising a trunk line, a plurality of telephone lines, individual magnets controlling connection between the telephone lines and the trunk lines, a common magnet controlling all of said lines, and means for energizing said common magnet to open all telephone lines except the one calling.

54. A telephone system comprising a main central station, a branch station, a trunk line leading from the main to the branch station, a plurality of telephone lines leading to the branch station, individual magnets controlling the connection between the telephone lines and the trunk line, a common magnet, means operated thereby for controlling said lines, and means for energizing said common magnet to open all lines except the one calling.

55. A telephone system comprising a main station, a branch station, a trunk line connecting the main station with the branch station, a plurality of subscriber' telephone lines leading to the branch station, individual magnets controlling connection between the telephone lines and the trunk line, means by which a calling subscriber energizes his individual magnet to seize the trunk line, and means for energizing the common magnet to open the lines of all except the calling subscriber.

56. In telephony, a main central station, a branch central station connected thereto by a trunk line, a series of circuit-controlling electromagnets arranged at the branch central station, a group of subscribers' stations, each of which is individually connected to one of said electromagnets, a circuit-breaking electromagnet arranged at the branch central station and connected in multiple to an entire group of subscribers' stations, and contacts under the control of the electromagnets for controlling connection between the trunk line and any subscriber, and automatically breaking the circuits of the remaining subscribers of the group.

57. In trunk line telephone systems, a group of subscribers' stations connected to a branch central station which forms one terminal of the trunk line, electromagnetically-actuated contacts arranged at the branch central station and connected one or more to each of the subscribers' stations for controlling connection between the trunk line and the calling subscriber, and an electromagnetically-controlled circuit-breaking mechanism connected in multiple to the group of subscribers and operable by any subscriber making a call for cutting off communication between all of the other subscribers and the trunk line.

58. A telephone system comprising a plurality of telephone lines, means for automatically trunking calling lines into connection with the called lines, normally closed switches in said lines, and automatic means for opening normally closed switches in all of said lines, except that of the calling subscriber, said means controllable by the subscriber of any of said lines.

59. A telephone system comprising means for automatically trunking calling telephone lines into connection with the called lines, normally closed switches in said lines, and automatic means for a group of lines, adapted to open a normally closed switch in the normal circuit of each line in the group, except the one calling, said means controllable by any subscriber in the group.

60. A telephone system comprising a main station, a branch station, trunk line connection between said stations, subscribers' telephone lines leading to said branch station, individual magnets for said telephone lines, line circuits for energizing said magnets to give calling subscribers trunk line connection to the main station, a common magnet controlling said telephone lines, and automatic means for energizing said common magnet to open a plurality of said telephone lines when a subscriber calls.

61. A telephone system comprising a trunk line, telephone lines, individual magnets for said telephone lines, means for energizing any magnet to give a calling subscriber possession of said trunk line, a common magnet, and automatic means for energizing said common magnet to render unresponsive a plurality of said individual magnets when any subscriber calls.

62. A telephone system comprising telephone lines, a trunk line common to said telephone lines, subscribers' individual magnets, means for energizing any magnet to give a calling subscriber possession of the trunk line, and automatic means for rendering a plurality of said telephone lines inoperative for calling when a subscriber calls.

63. A telephone system comprising a trunk line, a group of subscribers' telephone lines, an automatic switch controllable over the trunk line from any calling telephone line, and automatic means for rendering all other telephone lines inoperative for calling when one telephone line of the group is in possession of the trunk line, said means located between the said switch and the substations of said telephone lines.

64. A telephone system comprising a group of subscribers' telephone lines, a trunk line, individual magnets for said telephone lines, means for energizing any magnet to give a calling subscriber possession of the trunk line, an automatic switch controllable over the trunk line from any calling telephone line, and automatic means for rendering all other telephone lines inoperative for calling when one telephone line of the group is in possession of the trunk line.

65. A telephone system comprising a group of subscribers' telephone lines, a trunk line common to said telephone lines, automatic means for extending connection from said trunk line, controllable over the trunk line from any calling telephone line, and automatic means for simultaneously rendering all other telephone lines in the group inoperative for calling when one telephone line is in possession of the trunk line.

66. A telephone system comprising a group of subscribers' stations, a circuit for each substation, a line common to said stations, automatic means for extending connection from the said line, controllable over the said line from any calling substation, a common magnet controlling the circuit of each substation, and automatic means for energizing said magnet to open all circuits of said group except that of the calling substation in possession of the line.

67. A telephone system comprising a group of substations, a line common to said substations, automatic means for extending connection from said line, controllable over the said line from any calling substation, and automatic means for simultaneously cutting out all substations of the group except the one calling over said line.

68. A telephone system comprising a group of telephone equipments, a trunk line common to all of said telephone equipments, individual magnets for said telephone equipments, means for energizing any magnet to place the corresponding telephone equipment in possession of the trunk line, an electromagnet common to all of said telephone equipments, means operated by said common magnet for rendering all other telephone equipments inoperative for calling when one telephone equipment of the same group is in possession of the trunk line, an energizing circuit for said common magnet, and a relay allotted to the trunk line and provided with means for controlling the said energizing circuit of the common magnet.

69. A telephone system comprising a main station, a branch station, a trunk line connecting the main station with the branch station, a group of telephone equipments suitably connected with the branch station, individual magnets for said telephone equipments, means for energizing any magnet to place the corresponding telephone equipment in possession of the trunk line, an electromagnet common to all of said telephone equipments, means operated by said common magnet for rendering all other telephone equipments inoperative for calling when one telephone equipment of the group is in possession of the trunk line, an energizing circuit for said common magnet, and a relay allotted to the trunk line and provided with means for controlling the said energizing circuit of the common magnet.

70. A telephone system comprising a trunk line, a group of telephone equipments normally connected with said trunk line, individual magnets for said telephone equipments, means for energizing any magnet to place the corresponding telephone equipment in possession of the line, an electromagnet common to said telephone equipments, means operated by said common magnet for disconnecting from the trunk line all of the telephone equipments except the one in possession of said line, and automatic means for energizing said common magnet.

71. A telephone system comprising a group of telephone equipments, a trunk line common to said telephone equipments, individual magnets for said telephone equipments, each magnet provided with contacts controlling connection between the trunk line and the corresponding telephone equipment, a magnet common to all of said telephone equipments, means for energizing any individual magnet to place the corresponding telephone equipment in possession of the trunk line, means operated by said common magnet for rendering unresponsive all of said individual magnets except the one corresponding to the telephone equipment in possession of the trunk line, and means for energizing said common magnet whenever a telephone equipment is brought into use.

72. A telephone system comprising a main station, a branch station, a trunk line connecting the two stations, a group of telephone equipments suitably connected with said branch station, individual magnets for said telephone equipments, means for energizing each magnet when the subscriber of the corresponding telephone equipment answers a call, a magnet common to said telephone equipments, means operated by the energizing of said common magnet for rendering all other telephone equipments inoperative for calling when one telephone equipment of the group answers a call, and means for energizing said common magnet whenever the subscriber of any telephone equipment answers a call, whereby all subscribers except the one called are cut off from connection with said trunk line.

73. A telephone system comprising a trunk line, a plurality of telephone equipments, individual magnets for said telephone equipments, means for energizing any magnet when the subscriber of the corresponding telephone equipment calls, and automatic means for locking and rendering inoperative the magnets of all other telephone equipments when the subscriber at one telephone equipment answers a call over said trunk line.

74. A telephone system comprising telephone lines, automatic connectors less in number than said telephone lines, means for operating said connectors to extend connection to called telephone lines, and automatic means by which any telephone line or lines grouped with a called line will be temporarily rendered inoperative for calling when the called subscriber answers the call.

75. A telephone system comprising telephone lines, automatic means for trunking calling lines into connection with called lines, and automatic means for temporarily cutting out and rendering inoperative any line or lines grouped with the line of the called subscriber.

76. A telephone system comprising telephone lines, automatic means for trunking calling lines into connection with called lines, and automatic means for temporarily cutting out and rendering inoperative simultaneously any line or lines grouped with the line of the calling subscriber.

77. In apparatus of the character specified, the combination with a line circuit and a plurality of subscribers' station circuits connected in multiple with the line circuit, of means common to all of said station circuits and operated from a subscriber's station by the closing of the circuit through any one of the station circuits for automatically cutting the remaining station circuits out of the line circuit, a master telephone also adapted to be cut out by the said common means, and suitable means controllable at the master telephone for signaling the different subscribers.

78. In apparatus of the character specified, the combination with a line circuit and a plurality of subscribers' station circuits connected in multiple therewith, of electrical means common to all said station circuits and operated from a subscriber's station for automatically cutting the remaining station circuits out of the line circuit, a master telephone also adapted to be cut out by the said common means, and suitable means controllable at the master telephone for signaling the different subscribers.

79. In apparatus of the character specified, the combination with a line circuit and a plurality of subscribers' station circuits connected in multiple with the line circuit, of means common to all of said station circuits and operated from a subscriber's station when the circuit is closed through any one of the station circuits for automatically cutting the remaining station circuits out of the line circuit, and automatic means for extending connection to said line circuit when one of the subscribers is called.

80. In apparatus of the character specified, the combination with a line circuit and a plurality of subscribers' station circuits connected in multiple therewith, of means common to all said station circuits and operated from a subscriber's station for automatically cutting the remaining station circuits out of the line circuit, and automatic means for extending connection to said line circuit when one of the subscribers is called.

81. In apparatus of the character specified, the combination with a line circuit and a plurality of subscribers' station circuits connected in multiple with the line circuit, of means common to all said station circuits and operated from a subscriber's station when the circuit is closed through any one of the station circuits for automatically cutting the remaining station circuits out of the line circuit, and automatic means for extending connection from said line circuit when a subscriber thereon calls another subscriber.

82. In apparatus of the character specified, the combination with a line circuit and a plurality of subscribers' station circuits connected in multiple therewith, of means common to all said station circuits and operated from a subscriber's station for automatically cutting the remaining station circuits out of the line circuit, and automatic means for extending connection from said line circuit when a subscriber thereon calls another subscriber.

83. In a telephone system, a trunk line, a plurality of subscribers' lines connected with said trunk line, and automatic means controlled by direct current for disconnecting all except the calling line when one of the subscribers calls.

84. In a telephone system, a trunk line provided with multiple terminals, a plurality of subscribers' lines each provided with a terminal engaging one of the multiple terminals of the trunk line, and automatic means controlled by direct current for disengaging the terminals of all except the calling line when one of the subscribers calls.

85. A trunk line, a plurality of telephone lines normally connected therewith, and automatic means controlled by direct current by which a calling subscriber disconnects the telephone lines of the other subscribers.

86. A trunk line, multiple terminals therefor, a telephone line normally in engagement with each terminal, and automatic devices controlled by direct current for disengaging all of the lines from said terminals, except that of the calling subscriber, when any subscriber calls.

87. In a telephone system, a trunk line terminating at one end in a plurality of subscribers' lines and at the other end in an automatic switch, and automatic means for simultaneously disconnecting all except the calling line.

88. A telephone system comprising a main line having a source of direct current, a plurality of branch lines initially connected with the main line, and means operable by said current upon closing the talking circuit of one of said branch lines for disconnecting all the other branch lines.

89. In a telephone system, the combination of a subscriber's line, a plurality of telephones connected with said line, a switch at each telephone for connecting the line with ground, an electromagnetically-controlled lockout mechanism adapted to be operated by closing connection to ground at any telephone, said lock-out mechanism being adapted to disconnect from the line all of the telephones except the one in use, and a source of current for operating said lock-out mechanism.

90. In a telephone system, the combination of a subscriber's line, a plurality of telephones connected with said line, a normally-open ground connection at each telephone, and lock-out electromagnets adapted to be operated by the closure of any connection to ground, together with trunk lines and trunk-selecting switch mechanism also adapted to be operated by electrical impulses produced through the medium of any one of said ground connections, said lock-out magnets being adapted to disconnect from the line all of the telephones except the one in use.

91. In a telephone system, the combination of a subscriber's line, a main or master telephone connected therewith, a plurality of extension telephones connected with the said line, a ground connection at each telephone, trunk lines and trunk-selecting switch mechanism adapted to be operated by electrical impulses adapted to be transmitted through the medium of any of the ground connections, signaling circuits under the control of the operator at the master telephone for producing an audible call signal at any one of the extension telephones, and a lock-out mechanism adapted when any of said extension telephones is put in use to automatically disconnect from the line all of the other telephones connected therewith.

92. In a telephone system, the combination of a line, a plurality of extensions therefrom, a normally closed switch in each extension, relay magnets having armatures adapted to control said switches, circuits for energizing any relay magnet when its allotted extension is put in use, a locking magnet provided with an armature having portions adapted to engage the armatures of the said relays, and subscriber-controlled circuits whereby said locking magnet is also energized whenever any extension is put in use, said locking magnet being operated to open the switches of all extensions except the one put in use.

93. In a telephone system, the combination of a subscriber's line, a plurality of telephones connected with said line, a relay for each telephone, subscriber-controlled circuits whereby the use of any telephone causes the energizing of its allotted relay, an electromagnet provided with an armature coöperating with all of said relays to disconnect all of the telephones except the one put in use, and subscriber controlled circuits whereby the said magnet is always energized whenever a telephone is used.

94. In a telephone system, the combination of a subscriber's line, a main or master telephone connected with the line, a plurality of extension telephones connected with the said line, signaling circuits for enabling the operator at the master telephone to produce an audible call signal at any extension telephone, and additional signaling connections and devices for producing an audible signal for the operator at the master telephone as soon as the call is answered at the extension telephone.

95. In a telephone system, the combination of a subscriber's line, a plurality of telephones connected with said line, a switch at each telephone for connecting the line with ground, and a lock-out mechanism adapted to be operated by closing connection to ground at any telephone, said lock-out mechanism being adapted to disconnect from the line all of the telephones except the one in use, the said system also comprising a movable wiper for establishing a guarding potential for the line of any called subscriber, and for thereby precluding the automatic completion of a connection with any busy subscriber's line.

96. In a telephone system, the combination of a subscriber's line, a plurality of telephones connected with said line, a normally open ground connection at each telephone, and lock-out electromagnets adapted to be operated by the closure of any connection to ground, together with trunk lines and trunk-selecting switch mechanism also adapted to be operated by electrical impulses produced through the medium of any one of said ground connections, said lock-out magnets being adapted to disconnect from the line all of the telephones except the one in use, the said system also comprising a movable wiper for establishing a guarding potential for the line of any called subscriber, and for thereby precluding the automatic completion of a connection with any busy subscriber's line.

97. In a telephone system, the combination of a subscriber's line, a main or master telephone connected therewith, a plurality of extension telephones connected with the said line, a ground connection at each telephone, trunk lines and trunk-selecting switch mechanism adapted to be operated by electrical impulses adapted to be transmitted through the medium of any of the ground connections, signaling circuits under the control of the operator at the master telephone for producing an audible call signal at any one of the extension telephones, and a lock-out mechanism adapted when any of said extension telephones is put in use to automatically disconnect from the line all of the other telephones connected therewith, the said system also comprising a movable wiper for establishing a guarding potential for the line of any called subscriber, and for thereby precluding the automatic completion of a connection with any busy subscriber's line.

98. In a telephone system, the combination of a line, a plurality of extensions therefrom, a normally-closed switch in each extension, relay magnets having armatures adapted to control said switches, circuits for energizing any relay magnet when its allotted extension is put in use, a locking magnet provided with an armature having portions adapted to engage the armatures of the said relays, and subscriber-controlled circuits whereby said locking magnet is also energized whenever any extension is put in use, said locking magnet being operated to open the switches of all extensions except the one put in use, the said system also comprising a movable wiper for establishing a guarding potential for the line of any called subscriber, and for thereby precluding the automatic completion of a connection with any busy subscriber's line.

99. In a telephone system, the combination of a subscriber's line, a plurality of telephones connected with said line, a relay for each telephone, subscriber-controlled circuits whereby the use of any telephone causes the energizing of its allotted relay, an electromagnet provided with an armature coöperating with all of said relays to disconnect all of the telephones except the one put in use, and subscriber-controlled circuits whereby the said magnet is always energized whenever a telephone is used, the said system also comprising a movable wiper for establishing a guarding potential for the line of any called subscriber, and for thereby precluding the automatic completion of a connection with any busy subscriber's line.

100. In a telephone system, the combination of a subscriber's line, a main or master telephone connected with the line, a plurality of extension telephones connected with the said line, signaling circuits for enabling the operator at the master telephone to produce an audible call signal at any extension telephone, and additional signaling connections and devices for producing an audible signal for the operator at the master telephone as soon as the call is answered at the extension telephone, the said system also comprising a movable wiper for establishing a guarding potential for the line of any called subscriber, and for thereby precluding the automatic completion of a connection with any busy subscriber's line.

101. A telephone system comprising a trunk line, a plurality of telephone lines, as many electromagnets as there are telephone lines, contacts operated by said magnets for controlling connection between said telephone lines and the trunk line, and an electromagnet provided with a mechanical member for opening all other telephone lines when one telephone line calls over the trunk line.

102. A telephone system comprising a trunk line, a plurality of telephone lines, an individual electromagnet for each line, line circuits for energizing said magnets when the subscribers call, a common magnet controlling all of said magnets, and telephone-controlled circuits by which said common magnet is automatically energized to render inoperative all individual magnets except that of the calling subscriber.

103. A telephone system comprising a trunk line, a plurality of telephone lines, individual magnets controlling connection between the telephone lines and the trunk line, a common magnet controlling all of said lines, and telephone-controlled circuits for energizing said common magnet to open all telephone lines except the one calling.

104. A telephone system comprising a main central station, a branch station, a trunk line leading from the main to the branch station, a plurality of telephone lines leading to the branch station, individual magnets controlling the connection between the telephone lines and the trunk line, a common magnet, a mechanical member operated thereby for controlling said lines, and telephone-controlled circuits for energizing said common magnet to open all lines except the one calling.

105. A telephone system comprising a main station, a branch station, a trunk line connecting the main station with the branch station, a plurality of subscribers' telephone lines leading to the branch station, individual magnets controlling connection between the telephone lines and the trunk line, subscriber-controlled circuits by which a calling subscriber energizes his individual magnet to seize the trunk line, and telephone-controlled circuits for energizing the common magnet to open the lines of all except the calling subscriber.

106. A telephone system comprising a plurality of telephone lines, progressively movable switches for automatically trunking calling lines into connection with the called lines, normally closed switches in said lines, and magnets for opening normally closed switches in all of said lines, except that of the calling subscriber, said magnets controllable by the subscriber of any of said lines.

107. A telephone system comprising progressively movable switches for automatically trunking calling telephone lines into connection with the called lines, normally closed switches in said lines, and magnets for a group of lines, adapted to open a normally closed switch in the normal circuit of each line in the group, except the one calling, said magnets controllable by any subscriber in the group.

108. A telephone system comprising a main station, a branch station, trunk line connection between said stations, subscribers' telephone lines leading to said branch station, individual magnets for said telephone lines, line circuits for energizing said magnets to give calling subscribers trunk line connection to the main station, a common magnet controlling said telephone lines, and automatic subscriber-controlled circuits for energizing said common magnet to open a plurality of said telephone lines when a subscriber calls.

109. A telephone system comprising a trunk line, telephone lines, individual magnets for said telephone lines, subscriber-controlled circuits for energizing any magnet to give a calling subscriber possession of said trunk line, a common magnet, and automatic subscriber-controlled circuits for energizing said common magnet to render unresponsive a plurality of said individual magnets when any subscriber calls.

110. A telephone system comprising telephone lines, a trunk line common to said telephone lines, subscribers' individual magnets, subscriber-controlled circuits for energizing any magnet to give a calling subscriber possession of the trunk line, and automatic subscriber-controlled circuits for rendering a plurality of said telephone lines inoperative for calling when a subscriber calls.

111. A telephone system comprising a trunk line, a group of subscribers' telephone lines, an automatic switch controllable over the trunk line from any calling telephone line, and a magnet for rendering all other telephone lines inoperative for calling when one telephone line of the group is in possession of the trunk line, said magnet located between the said switch and the substation of said telephone lines.

112. A telephone system comprising a group of subscribers' telephone lines, a trunk line, individual magnets for said telephone lines, subscriber-controlled circuits for energizing any magnet to give a calling subscriber possession of the trunk line, an automatic switch controllable over the trunk line from any calling telephone line, and an automatic magnet for rendering all other telephone lines inoperative for calling when one telephone line of the group is in possession of the trunk line.

113. A telephone system comprising a group of subscribers' telephone lines, a trunk line common to said telephone lines, automatic progressively movable switches for extending connection from said trunk line, controllable over the trunk line from any calling telephone line, and an automatic magnet for rendering all other telephone lines in the group inoperative for calling when one telephone line is in possession of the trunk line.

114. A telephone system comprising a group of subscribers' stations, a circuit for each substation, a line common to said stations, automatic progressively movable switches for extending connection from the said line, controllable over the said line from any calling substation, a common magnet controlling the circuit of each substation, and automatic subscriber-controlled circuits for energizing said magnet to open all circuits of said group except that of the calling substation in possession of the line.

115. A telephone system comprising a group of substations, a line common to said substations, automatic progressively movable switches for extending connection from said line, controllable over the said line from any calling substation, and an automatic magnet for simultaneously cutting out all substations of the group except the one calling over said line.

116. A telephone system comprising a group of telephone equipments, a trunk line common to all of said telephone equipments, individual magnets for said telephone equipments, subscriber-controlled circuits for energizing any magnet to place the corresponding telephone equipment in possession of the trunk line, an electromagnet common to all of said telephone equipments, an armature operated by said common magnet for rendering all other telephone equipments inoperative for calling when one telephone equipment of the same group is in possession of the trunk line, an energizing circuit for said common magnet, and a relay allotted to the trunk line and provided with contacts for controlling the said energizing circuit of the common magnet.

117. A telephone system comprising a main station, a branch station, a trunk line connecting the main station with the branch station, a group of telephone equipments suitably connected with the branch station, individual magnets for said telephone equipments, subscriber-controlled circuits for energizing any magnet to place the corresponding telephone equipment in possession of the trunk line, an electromagnet common to all of said telephone equipments, an armature operated by said common magnet for rendering all other telephone equipments inoperative for calling when one telephone equipment of the group is in possession of the trunk line, an energizing circuit for said common magnet, and a relay allotted to the trunk line and provided with contacts for controlling the said energizing circuit of the common magnet.

118. A telephone system comprising a trunk line, a group of telephone equipments normally connected with said trunk line, individual magnets for said telephone equipments, subscriber-controlled circuits for energizing any magnet to place the corresponding telephone equipment in possession of the line, an electromagnet common to said telephone equipments, an armature operated by said common magnet for disconnecting from the trunk line all of the telephone equipments except the one in possession of said line, and automatic subscriber-controlled circuits for energizing said common magnet.

119. A telephone system comprising a trunk line, a plurality of telephone equipments, individual magnets for said telephone equipments, subscriber-controlled circuits for energizing any magnet when the subscriber of the corresponding telephone equipment calls, and a latch and armature for locking and rendering inoperative the magnets of all other telephone equipments when the subscriber at one telephone equipment answers a call over said trunk line.

120. A telephone system comprising telephone lines, automatic connectors less in number than said telephone lines, an impulse sender for operating said connectors to extend connection to called telephone lines, and a magnet by which any telephone line or lines grouped with a called line will be temporarily rendered inoperative for calling when the called subscriber answers the call.

121. A telephone system comprising telephone lines, automatic progressively movable switches for trunking calling lines into connection with called lines, and an armature and a latch for temporarily cutting out and rendering inoperative any line or lines grouped with the line of the called subscriber.

122. A telephone system comprising telephone lines, automatic progressively movable switches for trunking calling lines into connection with called lines, and an armature and a latch for temporarily cutting out and rendering inoperative simultaneously any lines grouped with the line of the calling subscriber.

123. In apparatus of the character specified, the combination with a line circuit and a plurality of subscribers' station circuits connected in multiple with the line circuit, of a magnet common to all of said station circuits and operated from a subscriber's station by the closing of the circuit through any one of the station circuits for automatically cutting the remaining station circuits out of the line circuit.

124. In apparatus of the character specified, the combination with a line circuit and a plurality of subscribers' station circuits connected in multiple therewith, of a magnet common to all said station circuits and operated from a subscriber's station for automatically cutting the remaining station circuits out of the line circuit.

125. In apparatus of the character specified, the combination with a line circuit and a plurality of subscribers' station circuits connected in multiple with the line circuit, of a magnet common to all of said station circuits and operated from a subscriber's station by the closing of the circuit through any one of the station circuits for automatically cutting the remaining station circuits out of the line circuit, a master telephone also adapted to be cut out by the said common means, and suitable signaling circuits controllable at the master telephone for signaling the different subscribers.

126. In apparatus of the character specified, the combination with a line circuit and a plurality of subscribers' station circuits connected in multiple therewith, of a magnet common to all said station circuits and operated from a subscriber's station for automatically cutting the remaining station circuits out of the line circuit, a master telephone also adapted to be cut out by the said common magnet, and suitable signaling circuits controllable at the master telephone for signaling the different subscribers.

127. In apparatus of the character specified, the combination with a line circuit and a plurality of subscribers' station circuits connected in multiple with the line circuit, of a magnet common to all of said station circuits and operated from a subscriber's station when the circuit is closed through any one of the station circuits for automatically cutting the remaining station circuits out of the line circuit, and automatic progressively movable switches for extending connection to said line circuit when one of the subscribers is called.

128. In apparatus of the character specified, the combination with a line circuit and a plurality of subscribers' station circuits connected in multiple therewith, of a magnet common to all said station circuits and operated from a subscriber's station for automatically cutting the remaining station circuits out of the line circuit, and automatic progressively movable switches for extending connection to said line circuit when one of the subscribers is called.

129. In apparatus of the character specified, the combination with a circuit and a plurality of subscribers' station circuits connected in multiple with the line circuit, of a magnet common to all said station circuits and operated from a subscriber's station when the circuit is closed through any one of the station circuits for automatically cutting the remaining station circuits out of the line circuit, and automatic progressively movable switches for extending connection from said line circuit when a subscriber thereon calls another subscriber.

130. In apparatus of the character specified, the combination with a line circuit and a plurality of subscribers' station circuits connected in multiple therewith, of a magnet common to all said station circuits and operated from a subscriber's station for automatically cutting the remaining station circuits out of the line circuit, and automatic progressively movable switches for extending connection from said line circuit when a subscriber thereon calls another subscriber.

131. In a telephone system, a trunk line, a plurality of subscribers' lines connected with said trunk line, and a magnet controlled by direct current for disconnecting all except the calling line when one of the subscribers calls.

132. In a telephone system, a trunk line provided with multiple terminals, a plurality of subscribers' lines each provided with a terminal engaging one of the multiple terminals of the trunk line, and a magnet controlled by direct current for disengaging the terminals of all except the calling line when one of the subscribers calls.

Signed by us at Chicago, Cook county, Illinois, this 13th day of November, 1905.

TALBOT G. MARTIN.
JOHN ERICKSON.

Witnesses:
EDW. D. FALES,
B. D. WILLIS.